United States Patent
Mitchell, Jr.

(10) Patent No.: US 10,667,199 B1
(45) Date of Patent: May 26, 2020

(54) SYSTEMS AND METHODS FOR IMPROVING ROUTING OF COMMUNICATIONS TO EMERGENCY SERVICES

(71) Applicant: NG911 Services, Inc., Bellevue, WA (US)

(72) Inventor: Donald L. Mitchell, Jr., Bellevue, WA (US)

(73) Assignee: NG911 Services, Inc., Bellevue, WA (US)

( * ) Notice: Subject to any disclaimer, the term of this patent is extended or adjusted under 35 U.S.C. 154(b) by 0 days.

(21) Appl. No.: 16/358,484

(22) Filed: Mar. 19, 2019

(51) Int. Cl.
*H04W 64/00* (2009.01)
*H04W 40/20* (2009.01)
*H04W 4/90* (2018.01)
*H04L 29/06* (2006.01)
*H04M 7/00* (2006.01)

(52) U.S. Cl.
CPC ........... *H04W 40/20* (2013.01); *H04L 65/105* (2013.01); *H04L 65/1006* (2013.01); *H04M 7/0093* (2013.01); *H04W 4/90* (2018.02)

(58) Field of Classification Search
CPC ..... H04W 40/20; H04W 4/90; H04M 7/0093; H04L 65/1006; H04L 65/105
See application file for complete search history.

(56) References Cited

U.S. PATENT DOCUMENTS

| | | | |
|---|---|---|---|
| 6,721,395 B2 | 4/2004 | Martinez | |
| 6,922,565 B2 | 7/2005 | Rhodes et al. | |
| 7,209,758 B1 | 4/2007 | Moll et al. | |
| 7,224,956 B1 | 5/2007 | O'Neil | |
| 7,684,782 B2 | 3/2010 | Ashley, Jr. et al. | |
| 7,742,578 B1 * | 6/2010 | Klesper | H04M 3/5116 379/45 |
| 7,796,998 B1 | 9/2010 | Zellner et al. | |

(Continued)

OTHER PUBLICATIONS

Aloudat, A., and K. Michael, "The Application of Location Based Services in National Emergency Warning Systems: SMS, Cell Broadcast Services and Beyond," in P. Mendis & A. Yates (Eds.), Recent Advances in National Security Technology and Research: Proceedings of the 2010 National Security Science and Innovation Conference, Canberra: Australian Security Research Centre, 2011, 30 pages.

(Continued)

*Primary Examiner* — Sithu Ko
(74) *Attorney, Agent, or Firm* — Christensen O'Connor Johnson Kindness PLLC

(57) ABSTRACT

Systems and techniques for routing emergency communications to appropriate public safety answering points (PSAPs) based on location information associated with the communications are provided. Currently, only imprecise location information is available for call routing, and retrieving the imprecise location information requires a slow, expensive query to an automatic location identification (ALI) database. The present disclosure obtains location information that can be used for routing without performing the query to the ALI database, and also incorporates the use of precise location information available from mobile device providers (when available). Similar techniques for routing other types communications to other destination devices based on location information are also disclosed.

16 Claims, 14 Drawing Sheets

(56) References Cited

U.S. PATENT DOCUMENTS

| | | | |
|---|---|---|---|
| 8,340,630 B1 | 12/2012 | Ward | |
| 8,369,266 B2 | 2/2013 | Jin et al. | |
| 8,923,803 B2 | 12/2014 | Ray et al. | |
| 9,408,046 B2 | 8/2016 | Morin et al. | |
| 2003/0086539 A1* | 5/2003 | McCalmont | H04M 3/42 379/45 |
| 2008/0267172 A1* | 10/2008 | Hines | H04L 29/12594 370/352 |
| 2010/0317317 A1* | 12/2010 | Maier | H04W 64/00 455/404.2 |
| 2012/0189002 A1* | 7/2012 | Poremba | H04L 12/66 370/352 |
| 2013/0029634 A1* | 1/2013 | Li | H04W 4/90 455/404.2 |
| 2013/0078943 A1* | 3/2013 | Biage | H04M 3/5116 455/404.2 |
| 2014/0295788 A1* | 10/2014 | Poremba | H04L 51/12 455/405 |
| 2014/0341210 A1* | 11/2014 | LaCroix | H04L 45/74 370/352 |
| 2017/0238129 A1 | 8/2017 | Maier et al. | |

OTHER PUBLICATIONS

Chai, G.P., "Alternative Positioning Method Using GSM Signals," Journal of Global Positioning Systems 3(1-2):101-105, 2004.

Kwan, M.-P., and J. Lee, "Emergency Response After 9/11: The Potential of Real-Time 3D GIS for Quick Emergency Response in Micro-Spatial Environments," Computers, Environment and Urban Systems 29(2):93-113, Mar. 2005.

Morris, A., "911 Dispatchers Use New Technologies to Quickly Locate Cellphone Callers," Star-News, Wilmington, N.C., Jun. 6, 2016, <http://www.govtech.com/dc/articles/911-Dispatchers-Use-New-Technologies-to-Quickly-Locate-Cellphone-Callers.html> [retrieved Dec. 10, 2018], 7 pages.

Spatial Insights, "PSAP Pro," Pitney Bowes Business Insight, <http://spatialinsights.com/data-products/psap-pro/> [retrieved Dec. 10, 2018], 4 pages.

Willaredt, J., "WiFi and Cell-ID Based Positioning—Protocols, Standards and Solutions," SNET Project WT, Berlin, Jan. 26, 2011, 10 pages.

* cited by examiner

SYSTEMS AND METHODS FOR IMPROVING ROUTING OF COMMUNICATIONS TO EMERGENCY SERVICES

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, an emergency services network system is provided. The emergency services network system comprises at least one legacy network gateway (LNG) device or border control function (BCF) device; at least one emergency services routing proxy (ESRP) device; and a back-to-back user agent (B2BUA) device. The B2BUA device includes a non-transitory computer-readable medium having computer-executable instructions stored thereon. The instructions, in response to execution by one or more processors of the B2BUA device, cause the B2BUA device to perform actions comprising: receiving, from the at least one LNG device or BCF device, signaling information for an incident associated with a mobile telephony device; determining location reference transformation elements using the signaling information; querying a location transform data store to retrieve geographic information based on the location reference transformation elements; and causing the incident to be routed by the at least one ESRP device to a PSAP based on the geographic information.

In some embodiments, a method of enhancing location information for use in routing an incident associated with a mobile telephony device to a public safety answering point (PSAP) is provided. Signaling information is received for the incident. Location reference transformation elements are determined using the signaling information. A location transform data store is queried to retrieve geographic information based on the location reference transformation elements. The call is caused to be routed to a PSAP based on the geographic information.

In some embodiments, a non-transitory computer-readable medium is provided. The computer-readable medium has computer-executable instructions stored thereon that, in response to execution by one or more processors of a computing device, cause the computing device to perform actions for enhancing location information for use in routing an incident associated with a mobile telephony device to a PSAP. The actions comprise receiving, by the computing device, signaling information for the incident; determining, by the computing device, location reference transformation elements based on using the signaling information; querying, by the computing device, a location transform data store to retrieve geographic information based on the location reference transformation elements; and causing, by the computing device, the call to be routed to a PSAP based on the geographic information.

In some embodiments, a communication system is provided. The communication system comprises a network device, at least one routing proxy device, and a routing location determination device. The routing location determination device includes a non-transitory computer-readable medium having computer-executable instructions stored thereon that, in response to one or more processors of the location transformation device, cause the routing location determination device to perform actions comprising: receiving, from the network device, signaling information associated with a communication from a communication device; determining location reference transformation elements using the signaling information; querying a location transform data store to retrieve geographic information based on the location reference transformation elements; and causing the communication to be routed by the at least one routing proxy device to a destination device based on the geographic information.

In some embodiments, a method is provided. Signaling information associated with a communication from a communication device is received from a network device. Location reference transformation elements are determined using the signaling information. A location transform data store is queried to retrieve geographic information based on the location reference transformation elements. The communication is caused to be routed by at least one routing proxy device to a destination device based on the geographic information.

In some embodiments, a non-transitory computer-readable medium is provided. The computer-readable medium has computer-executable instructions stored thereon that, in response to execution by one or more processors of a computing device, cause the computing device to perform actions comprising: receiving, from a network device, signaling information associated with a communication from a communication device; determining location reference transformation elements using the signaling information; querying a location transform data store to retrieve geographic information based on the location reference transformation elements; and causing the communication to be routed by at least one routing proxy device to a destination device based on the geographic information.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The present disclosure relates to routing of communications, such as communications to public services that include emergency services. In North America, emergency services can be contacted by placing a call to the number "911" from any phone. Services that process these calls, which are known as public safety answering points (PSAPs), are geographically distributed. For example, a given jurisdiction such as a city or county may host a PSAP in order to answer emergency calls that are placed within its borders.

Before the widespread use of wireless phones, routing telephone calls to 911 was relatively simple. Each call would be placed from an originating device, and that originating device was associated with a calling phone number. Because the location of the originating device never changed, the calling phone number could be used to look up a permanent geographic location associated with the originating device/calling phone number, and that permanent geographic location could be used for determining a PSAP to which the call should be routed.

Figure 1A:
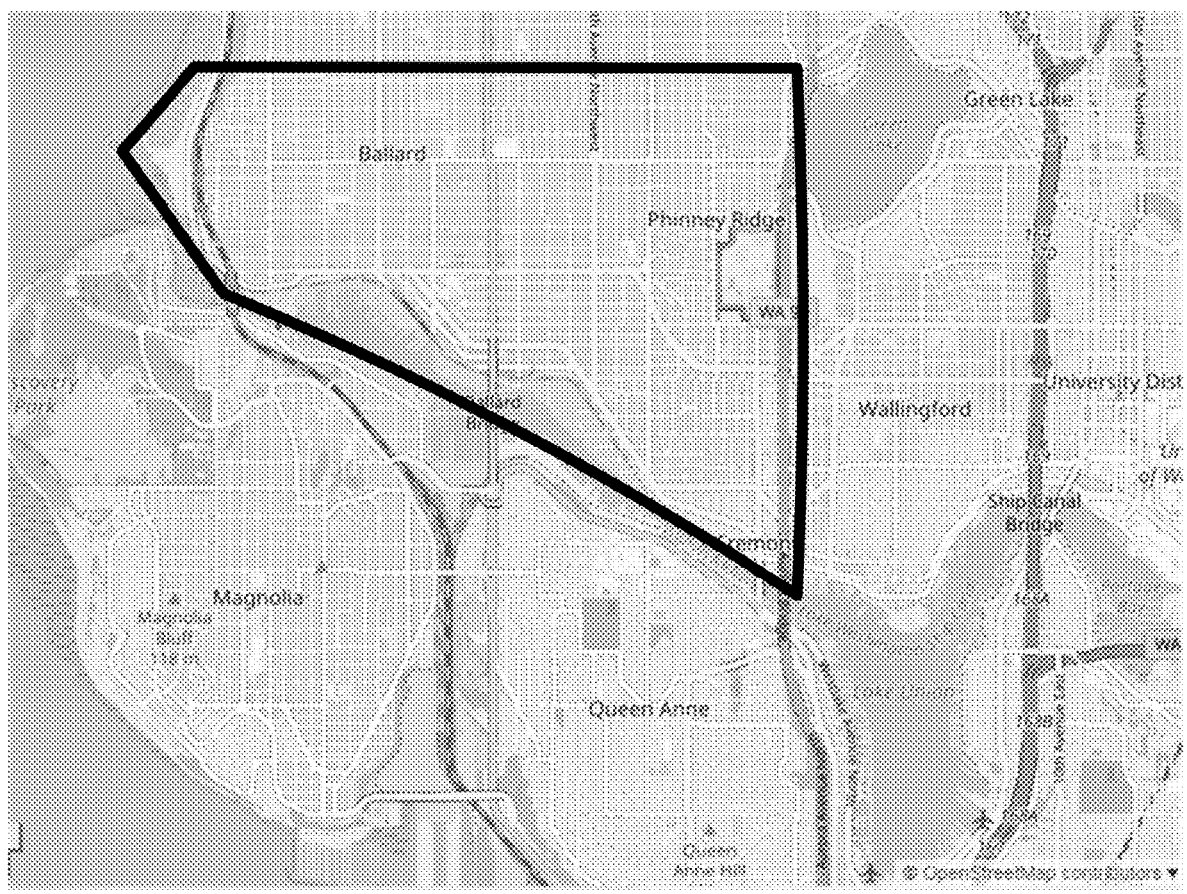
FIG. 1A is a map that illustrates an example of a portion of a plan for routing emergency incidents to a public safety answering point (PSAP)

For example, FIG. 1A is a map that illustrates an example of a portion of a plan for routing emergency incidents to a PSAP. As shown, calls that come from locations within the boundary would be routed to a PSAP that services the indicated neighborhoods, while calls from outside the boundary would be routed to other PSAPs. The illustrated boundary shows the benefits of such routing plans: the boundary separates neighborhoods north of the Ship Canal in Seattle, Wash., from neighborhoods south of the Ship Canal. Even though the neighborhoods are close as the crow flies, transportation between these neighborhoods is difficult due to the need to cross a limited number of bridges, and so it helps to decrease emergency response times to have calls north of the Ship Canal handled by first responders who are already north of the Ship Canal, and vice versa.

Figure 1B:
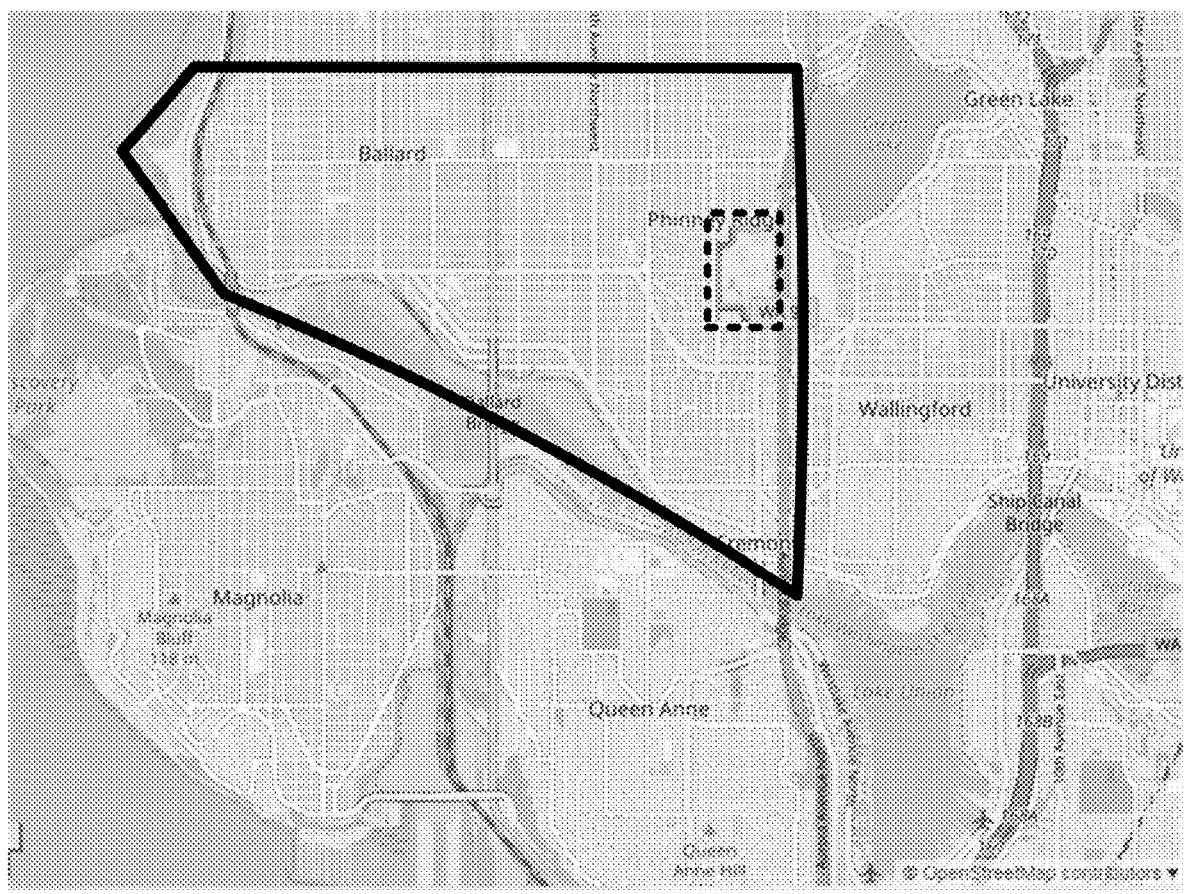
FIG. 1B is a map that illustrates another example of a plan for routing emergency incidents to a PSAP.

One additional benefit of using location information to route calls is the ability to load balance between particular PSAPs when dealing with large-scale events. For example, FIG. 1B is a map that illustrates another example of a plan for routing emergency incidents to a PSAP. The map illustrated in FIG. 1A is updated in FIG. 1B by adding a temporary routing boundary around Woodland Park Zoo, in response to, for example, a large fire or other extreme event at the facility. Calls from within the temporary routing boundary could be routed to a PSAP that is handling overall coordination for the extreme event, while calls from outside the temporary routing boundary could be routed to a different PSAP to help improve response to all of the issues.

The advent of widespread wireless communication has made the routing of communications to an appropriate PSAP more complicated, since a calling phone number can no longer be relied on as an indicator of a geographic location. Further, multiple types of communication, such as text messages (SMS), voice-over-IP (VoIP) calls, and other types of communications (collectively referred to as "incidents") are also routed to PSAPs.

Various techniques have been developed to allow incidents to be routed to PSAPs, even when they are not associated with a permanent location. At a high-level, these techniques involve associating an incoming incident with an Emergency Services Routing Key (ESRK) such as a pseudo automatic number identification ("pseudo-ANI" or "pANI") value based on a wireless tower and/or sector that received the incident. An emergency services network receives the pseudo-ANI from the originating service provider in order to route the incident to an appropriate PSAP.

Figure 2:
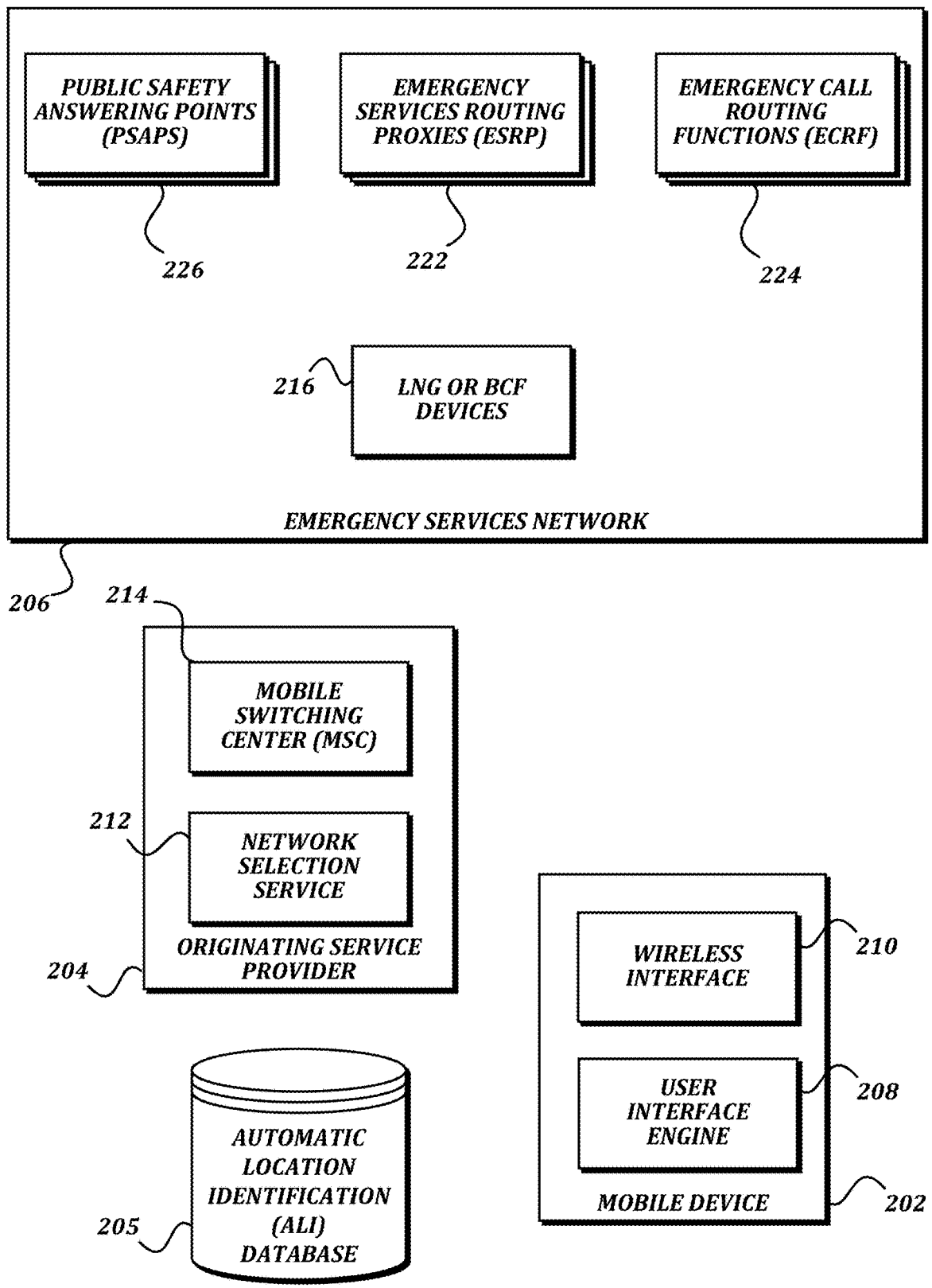
FIG. 2 is a block diagram that illustrates a system used for processing an incident generated by a mobile device.

FIG. 2 is a block diagram that illustrates such a system used for processing an incident generated by a mobile device. As shown, the system includes a mobile device 202, an originating service provider 204, an automatic location identification (ALI) database 205, and an emergency services network 206. At a high level of generality, incidents are initiated by the mobile device 202, and are provided to the emergency services network 206 by the originating service provider 204. The emergency services network 206 then routes the incident to an appropriate public safety system.

The mobile device 202 may be any type of device capable of initiating an incident and communicating with the originating service provider 204. Typically, a mobile device 202 may be a smartphone, a feature phone, or another type of wireless telephone. A mobile device 202 may also be a VoIP endpoint, if the originating service provider 204 supports VoIP calls. A mobile device 202 may also be a nomadic device, such as an analog telephone adapter (ATA) device or a laptop computing device.

The originating service provider 204 provides connectivity to the communication network for the mobile device 202. The originating service provider 204 is the service provider (for services such as cellular communication such as that provided by providers such as AT&T, Sprint, Verizon, and others; IP-based communication provided by multiple system operators such as Comcast, etc.; over-the-top communication such as Skype, WhatsApp, etc.; and voice, text, image-only, file, streaming, or other data communications) through which the mobile device 202 communicates. The emergency services network 206 receives communication traffic from multiple originating service providers 204, and connects the communication traffic to various public safety systems. A "public safety" system is an industry name for a communication system operated by and/or used for communicating with first responders, fire services, police services, medical services, vendors providing such services, and the associated supporting personnel and systems.

The illustrated mobile device 202 includes a wireless interface 210 and a user interface engine 208. The user interface engine 208 is configured to accept input from a user to initiate an incident. For example, the user interface engine 208 may present a keypad that receives a dialed number of "911" in order to initiate the incident. As another example, the user interface engine 208 may detect a repeated press of a button or other human-machine interaction (HMI) device, and may automatically initiate the incident in response. The wireless interface 210 is a combination of hardware and software components that allow the mobile device 202 to communicate with the originating service provider 204. Any suitable technology may be used, including but not limited to 2G, 3G, 4G, 5G, and LTE for cellular communications; Wi-Fi, WiMAX, and Bluetooth for IP-based communications; and Ethernet, USB, and FireWire for wired communications.

The illustrated originating service provider 204 includes a mobile switching center (MSC) 214 and a network selection service 212. The MSC 214 is a collection of computing devices that primarily provide communication switching services including connection set-up, release, and routing. The MSC 214 also provides a bridge between wireless access points (such as cell phone towers, not pictured) and various wired networks (including, but not limited to, the emergency services network 206 and/or a public switched telephone network (PSTN). The network selection service 212 is a collection of computing devices that provide support services to the MSC 214, including providing services for determining an emergency services network 206 to which an incident should be transmitted. The network selection service 212 may include a service control point (SCP), which services queries for information at a scale needed by an originating service provider 204 that serves the general public.

The illustrated automatic location identification (ALI) database 205 is a data store that is configured to store geographic information associated with a given call. In some embodiments, geographic information associated with pseudo-ANIs are stored in the ALI database 205, and can be updated by other devices such as the network selection service 212 of the originating service provider 204, and queried by the LNG/BCF devices 216 of the emergency services network 206.

The emergency services network 206 may be a Next Generation Core Services (NGCS, or NG9-1-1 Core Services) enabled network, and may be operated on top of a managed IP network such as an Emergency Services IP Network (ESInet). The illustrated emergency services network 206 includes one or more legacy network gateway (LNG) devices and/or border control function (BCF) devices 216, one or more emergency services routing proxies (ESRPs) 222, one or more emergency call routing functions (ECRFs) 224, and one or more public safety answering points (PSAPs) 226. Some emergency services networks 206 may include additional components that are not illustrated or described herein.

A legacy network gateway (LNG) device receives communications from non-IP based and/or circuit-switched based originating service providers 204, and prepares them for use within the emergency services network 206. A border control function (BCF) device receives communications from IP-based originating service providers 204, and provides a secure entry into the emergency services network 206 for such incidents. A given emergency services network 206 may include one or more LNG devices and one or more BCF devices, and an appropriate LNG device or BCF device will be chosen by the originating service provider 204 based on the type of communication supported by the originating service provider 204. In some embodiments, communication to an LNG device is then passed to a BCF device before being transmitted to other components of the emergency services network 206. The LNG and/or BCF devices 216 are illustrated as a single element in FIG. 2 for the sake of convenience.

As illustrated, the emergency services network 206 includes one or more emergency services routing proxy (ESRP) devices 222. The ESRP 222 is a NENA i3 functional element that routes communication within the emergency services network 206 after it has been received by the LNG or BCF devices 216 based on location and policy. In this role, the ESRP 222 may be a session initiation protocol (SIP) proxy server.

As illustrated, the emergency services network 206 may also include one or more emergency call routing function (ECRF) devices 224. The ECRF 224 may receive location to service translation (LoST) queries from ESRPs 222 that include location information to be used as a routing location, and may provide addresses such as uniform resource identifiers (URIs) to route the incident to an appropriate PSAP 226 associated with the routing location. Some ECRFs 224 may be present within the emergency services network 206 as shown, while some ECRFs 224 may be queried outside of the emergency services network 206 (not illustrated). As illustrated, the emergency services network 206 includes one or more PSAPs 226. A PSAP 226 is any system that is capable of receiving and processing incidents such as calls, texts, images, or other communications intended for emergency services.

Figure 3A:
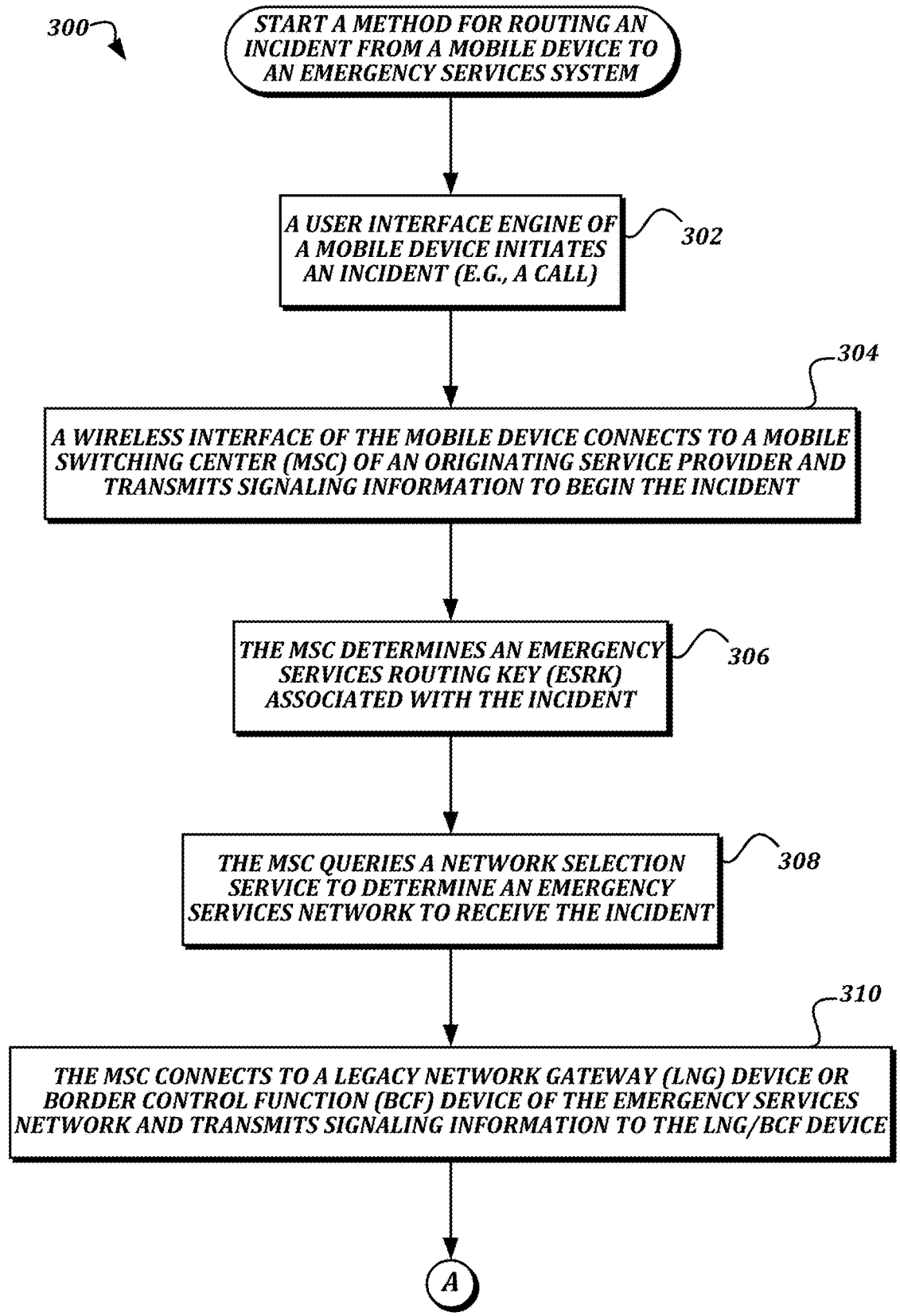
FIGS. 3A-3B are a flowchart that illustrates a method used for routing an incident from a mobile device to an emergency services system by the system illustrated in FIG. 2.
Figure 3B:
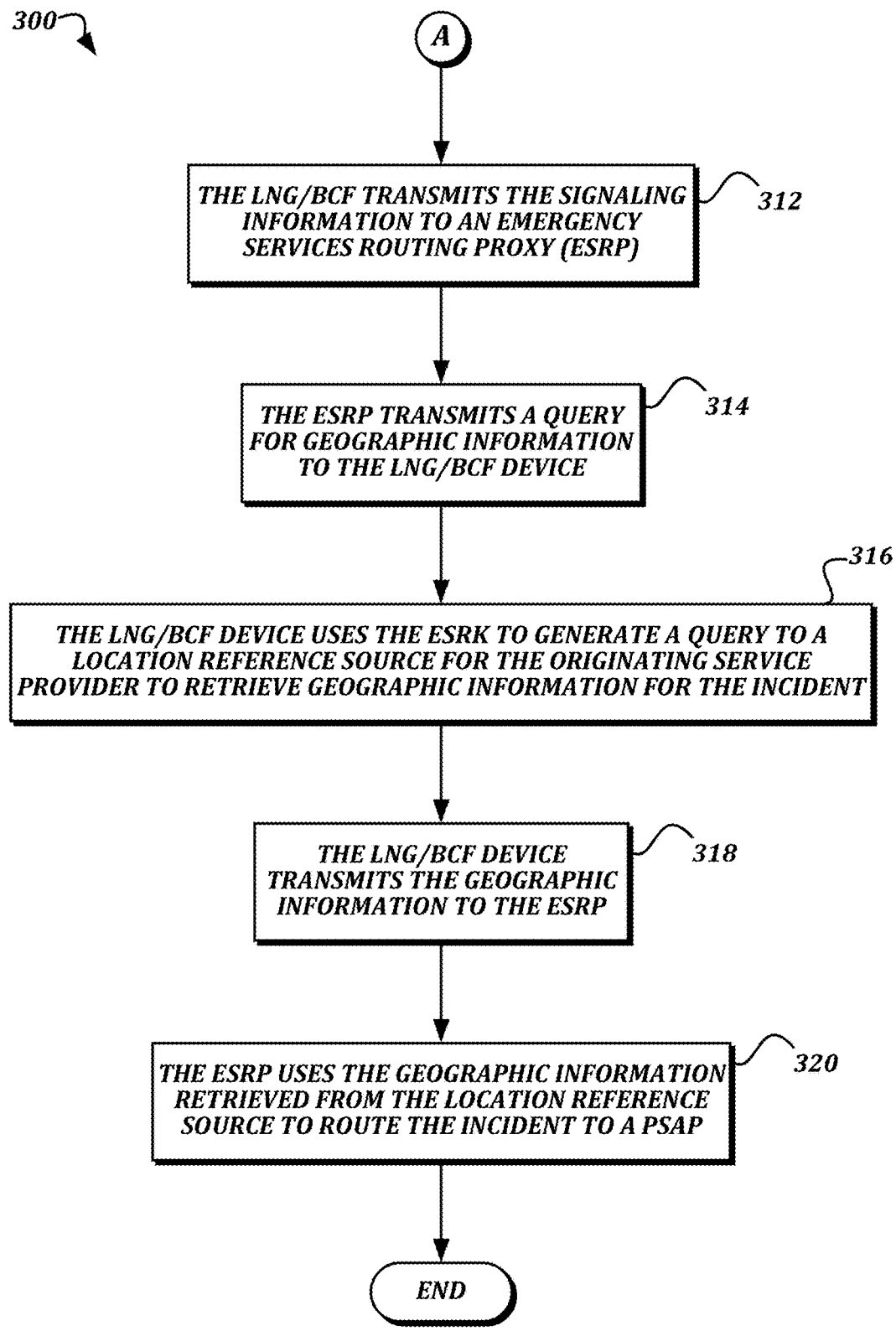

FIGS. 3A-3B are a flowchart that illustrates a method used for routing an incident from a mobile device to an emergency services system by the system illustrated in FIG. 2. The method 300 is generally more relevant for wireless, VoIP (NENA i2), or Fixed/Nomadic/Mobile wireless scenarios, because these communications are generally not placed from locations that can be easily determined (unlike landline communications, which are generally associated with a fixed installation location).

From a start block, the method 300 proceeds to block 302, where a user interface engine 208 of a mobile device 202 initiates an incident (for example, a call, a text message, an image, or a communication within an app). As discussed above, the user interface engine 208 may receive an input of a dialed emergency number, such as "911," or may initiate the incident in response to any other suitable input. At block 304, a wireless interface 210 of the mobile device 202 connects to a mobile switching center (MSC) 214 of an originating service provider 204 and transmits signaling information to begin the incident. Any suitable kind of signaling information that is supported by the MSC 214, such as SIP, SS7, or any other kind of signaling information, may be used.

At block 306, the MSC 214 determines an emergency services routing key (ESRK) associated with the incident. The ESRK may be created by the network selection service 212, and may be determined by the MSC 214 by requesting it from the network selection service 212. The MSC 214 may query the network selection service 212 to receive the ESRK associated with the incident. The ESRK may be a pseudo-ANI or pANI value. A pseudo-ANI value for the incident may be determined by selecting a value from a value pool associated with a cell phone tower and/or sector from which the incident was received. The ESRK may later be used as a query key to retrieve information associated with the incident, such as the cell phone tower associated with the incident, the sector associated with the incident, a description of the area covered by the sector associated with the incident, and/or a latitude and longitude associated with the incident. For VoIP incidents, the network selection service 212 may create an Emergency Services Query Key (ESQK) instead of an ESRK, but the ESQK is used in the same ways as the ESRK is described herein.

At block 308, the MSC 214 queries a network selection service 212 to determine an emergency services network 206 to receive the incident. The network selection service 212 may use the ESRK, characteristics of the cell phone tower and/or sector, or a default configuration for the MSC 214 or originating service provider 204 as a whole to determine the emergency services network 206 to receive the incident. The method 300 then proceeds to block 310, where the MSC 214 connects to a legacy network gateway (LNG) device or a border control function (BCF) device 216 of the emergency services network 206 and transmits signaling information to the LNG/BCF device 216. The signaling information may include the ESRK. The network address of the LNG/BCF device 216 may be determined along with the determination of the emergency services network 206 to receive the incident, and the selection of either an LNG device or a BCF device may be made based on the communication techniques supported by the MSC 214. The method 300 then proceeds to a continuation terminal ("terminal A"). From terminal A (FIG. 3B), the method 300 proceeds to block 312, where the LNG/BCF device 216 transmits the signaling information to an emergency services routing proxy (ESRP) 222.

In order to support functionality such as that illustrated and described in FIGS. 1A and 1B, wherein an administrator is able to route incidents within a particular geographical area to a particular PSAP, the ESRP 222 uses geographic information that identifies the location from which the incident was initiated. However, at this point in the method 300, the signaling information does not include geographic information that can be used for this purpose. Accordingly, at block 314, the ESRP 222 transmits a query for geographic information to the LNG/BCF device 216. In some embodiments, this query is an HTTP Enabled Location Delivery query, or HELD query.

At block 316, the LNG/BCF device 216 uses the ESRK to generate a query to a location reference source for the originating service provider 204 to retrieve geographic information for the incident. In some embodiments, the query may be sent to the MSC 214, the network selection service 212, or another component of the originating service provider 204, which in turn transmits a query to the location reference source. In some embodiments, the location reference source is the ALI database 205 or other keyed data store, and the query is sent directly to the location reference source by the LNG/BCF device 216. The ALI database 205 may be hosted by the originating service provider 204, or may be hosted by a third party. In some embodiments, the ALI database 205 may be hosted by a landline service provider under contract to the relevant jurisdiction. The ALI database 205 associates the pseudo-ANI with the currently available geographic information associated with the incident (such as the cell tower that received the communication from the mobile device 202, the sector from which the communication from the mobile device 202 was received, a description of the area covered by the sector from which the communication was received, and/or a latitude and longitude associated with the communication), and provides the geographic information back to the querying device. In some embodiments, the ALI database 205 in turn queries the network selection service 212 using the ESRK to obtain the geographic information.

At block 318, the LNG/BCF device 216 transmits the geographic information to the ESRP 222. In some embodiments, instead of sending a value of the geographic information to the ESRP 222, the LNG/BCF device 216 transmits a uniform resource locator (URL) that points to a location on the LNG/BCF device 216 from which the geographic information can be retrieved. At block 320, the ESRP 222 uses the geographic information retrieved from the location reference source to route the incident to a public safety answering point (PSAP) 226. The ESRP 222 may use the geographic information as a routing location to use to query an ECRF 224 so that a routing plan, such as the one illustrated in FIG. 1A or 1B, can be used to provide URIs of appropriate PSAPs 226 for predefined geographical areas. At this point, the PSAP 226 terminates the incident, meaning that the PSAP 226 answers the call, presents the text message, or otherwise performs actions to establish the communication session between the PSAP 226 and the mobile device 202.

The method 300 then proceeds to an end block to terminate while the PSAP 226 further processes the incident.

This method 300, and particularly the query to retrieve geographic information from the ALI database 205, has numerous drawbacks. For example, transmitting a query to the network selection service 212 of the originating service provider 204 in order to retrieve the geographic information consumes additional bandwidth between the originating service provider 204 and the emergency services network 204, it delays the process of routing the incident to the PSAP 226, and it incurs additional costs imposed by the provider of the ALI database 205. Further, the geographic information provided from the ALI database 205 is not particularly precise. Sometimes, the geographic information is merely a point associated with a centroid of a cell sector, which may not accurately reflect the location of the mobile device 202 within the cell sector. Sometimes, the geographic information is a textual description of the sector with no specific data that can be used for routing, because determining the latitude and/or longitude that could be used for routing can take 30 seconds or longer (too long to provide a reasonable user experience for the caller). In some instances, an operator at a PSAP 226 will obtain detailed geographic information while speaking with (or otherwise corresponding with) the user of the mobile device 202, and will end up transferring the incident to a more appropriate PSAP 226 for handling. This manual transfer of an incident from one PSAP 226 to another PSAP 226 is the worst case scenario, because the time of operators at PSAPs 226 is highly valuable, and time spent transferring incidents that could have been automatically routed to a more appropriate PSAP 226 is time wasted that could have been spent helping another user in dire need of assistance. Further, the actual transfer from one PSAP 226 to another PSAP 226 may take 50 seconds or more, which provides a confusing and undesirable experience for the caller.

Some sources of highly precise location information for mobile devices are becoming available. For example, Apple Inc. has developed a technology known as Hybridized Emergency Location (HELO) that estimates a location of a mobile device running iOS based on cell tower locations, Wi-Fi access points visible to the mobile device, and on-device data sources such as global positioning system (GPS) information and barometric sensors. The HELO system allows a PSAP to query for precise location information associated with a mobile device to help in guiding response to an incident. Google LLC has developed a similar technology, called Emergency Location Service (ELS), for use to estimate locations of mobile devices running Android.

Theoretically, the type of information available from ELS or HELO could be very useful for automatically routing incidents to appropriate PSAPs. Particularly, highly precise information could allow temporary routing to be set up for geofenced areas in response to disasters or other events wherein high volumes of incidents will be reported. Unfortunately, there are not currently any systems that are equipped to incorporate ELS, HELO, or similar technologies into the process for routing incidents to PSAPs 226. One issue is that ELS or HELO information is not always available, and is not always of high quality. For example, the mobile device 202 may not be receiving GPS or WiFi signals, or may have a very high uncertainty regarding the location determined from GPS or WiFi. In such situations, using the ELS or HELO information may produce a worse routing outcome than using the cell tower and/or sector location for routing. What is desired is are systems and techniques for routing incidents to PSAPs that can handle both this "rainy day" situation (the situation in which information from ELS, HELO, or other alternate location services is either unavailable or of low quality) and the "sunny day" situation (the situation in which high-quality information from ELS, HELO, or other alternate location services is available) while routing incidents to PSAPs based on location information. A separate goal is to avoid the added bandwidth, cost, and delay involved with transmitting queries to the originating service provider 204 and/or an ALI database 205.

Figure 4:
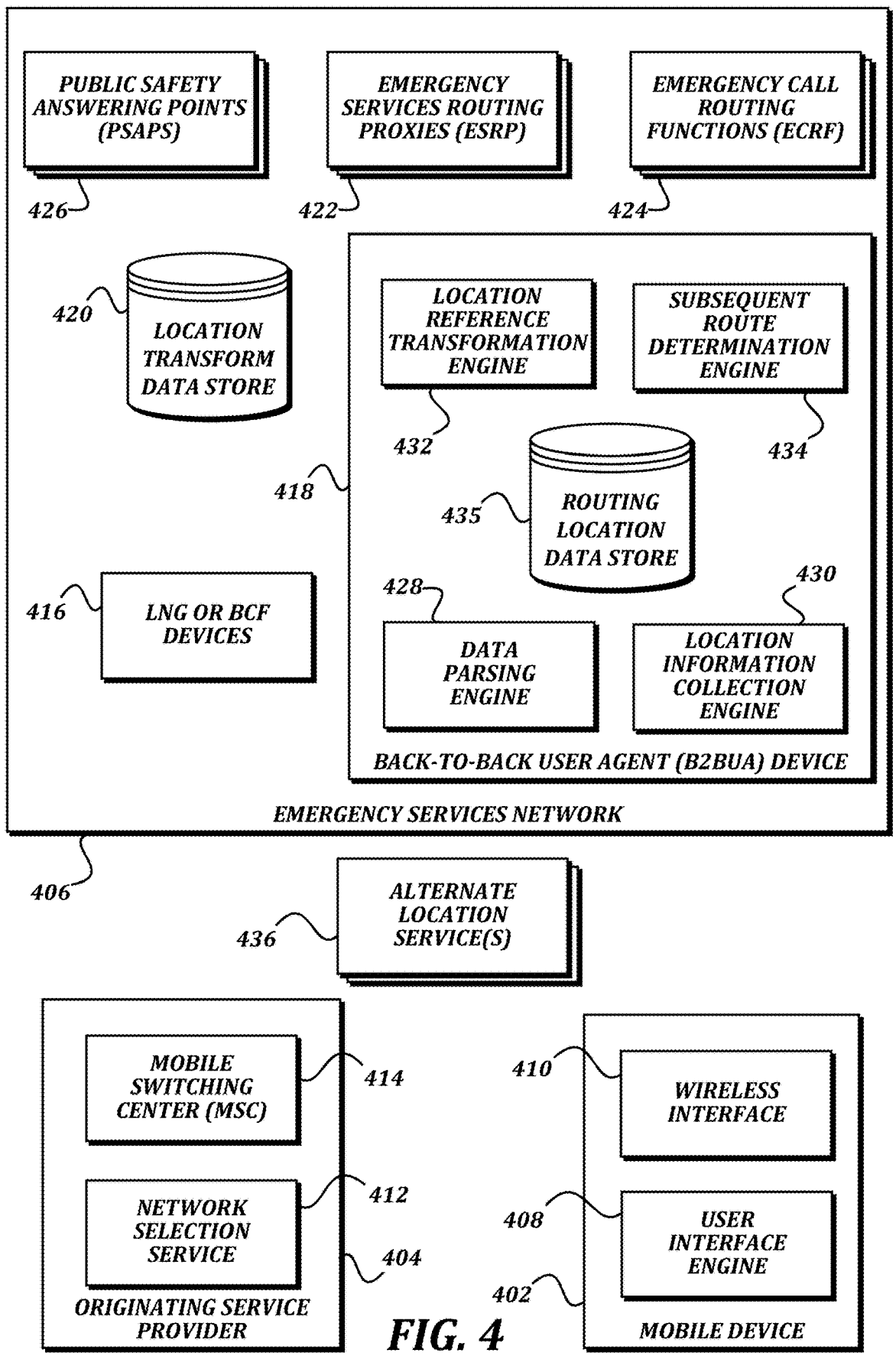
FIG. 4 is a block diagram that illustrates an example embodiment of a system for providing improved routing of incidents to PSAPs according to various aspects of the present disclosure.

FIG. 4 is a block diagram that illustrates an example embodiment of a system for providing improved routing of incidents to public safety answering points (PSAPs) according to various aspects of the present disclosure. The system is similar in some ways to the system illustrated in FIG. 2 and described above, but has been improved to allow location-based routing by transforming location reference data from sources like the network selection service into geographic data, and to allow the use of alternate location services such as HELO and ELS for routing if available. The transformation of data from the network selection service eliminates the need to submit a query to an ALI database for pANI-based communication flows. In the illustrated embodiment, the system includes a mobile device 402, an originating service provider 404, and an emergency services network 406.

As above, the mobile device 402 may be any type of device capable of initiating an incident and communicating with the originating service provider 404. Typically, a mobile device 402 may be a smartphone, a feature phone, or another type of wireless telephone that communicates with the originating service provider 404 via 2G, 3G, 4G, 5G, or other wireless telephony technology. A mobile device 402 may also be a VoIP endpoint or other type of device that communicates over internet protocol (IP), if the originating service provider 404 supports such communication. A mobile device 402 may also be a nomadic device, such as an analog telephone adapter (ATA) device or a laptop computing device.

As above, the originating service provider 404 provides connectivity to the communication network for the mobile device 404, and the emergency services network 406 receives communication traffic from multiple originating service providers 404, and connects the communication traffic to various public safety systems.

As illustrated in FIG. 4, the mobile device 402 includes a wireless interface 410 and a user interface engine 408. The user interface engine 408 is configured to accept input from a user to initiate an incident. For example, the user interface engine 408 may present a keypad that receives a dialed number of "911" in order to initiate the incident. As another example, the user interface engine 408 may detect a repeated press of a button or other human-machine interaction (HMI) device, and may automatically initiate the incident in response. As yet another example, the user interface engine 408 may present an interface of a communication app, such as a text messaging app, a video messaging app, an image-based messaging app, or other interface that allows the user to send any type of message to emergency services over IP. The wireless interface 410 is a combination of hardware and software components that allow the mobile device 402 to communicate with the originating service provider 404. Any suitable technology may be used, including but not limited to 2G, 3G, 4G, 5G, and LTE for cellular and/or IP-based communications; Wi-Fi, WiMAX, and Bluetooth for IP-based communications; and Ethernet, USB, and FireWire for wired communications. Some mobile devices 402 may include additional components that are not illustrated or described herein.

As illustrated, the originating service provider 404 includes a mobile switching center (MSC) 414 and a network selection service 412. As discussed above, the MSC 414 is a collection of computing devices that primarily provide communication switching services including connection set-up, release, and routing. The MSC 414 also provides a bridge between wireless access points (such as cell phone towers, not pictured) and various wired networks (including, but not limited to, the emergency services network 406, a public switched telephone network (PSTN), and/or the Internet. The network selection service 412 is a collection of computing devices that provide support services to the MSC 414, including providing services for determining an emergency services network 406 to which an incident should be transmitted. The network selection service 412 may include a service control point (SCP), which services queries for information at a scale needed by an originating service provider 404 that serves the general public. Some originating service providers 404 may include additional components that are not illustrated or described herein.

As discussed above, the emergency services network 406 may be a Next Generation Core Services (NGCS, or NG9-1-1 Core Services) enabled network, and may be operated on top of a managed IP network such as an Emergency Services IP Network (ESInet). The illustrated emergency services network 406 may include one or more legacy network gateway (LNG) devices and/or border control function (BCF) devices 416, one or more emergency services routing proxy (ESRP) devices 422, one or more emergency call routing function (ECRF) devices 424, and one or more public safety answering points (PSAPs) 426. Some emergency service networks 406 may include additional components that are not illustrated or described herein.

As discussed above, a legacy network gateway (LNG) device receives communications from non-IP based and/or circuit-switched based originating service providers 404, and prepares them for use within the emergency services network 406. A border control function (BCF) device receives communications from IP-based originating service providers 404, and provides a secure entry into the emergency services network 406 for such incidents. A given emergency services network 406 may include one or more LNG devices and one or more BCF devices, and an appropriate LNG device or BCF device will be chosen by the originating service provider 404 based on the type of communication supported by the originating service provider 404. In some embodiments, communication to an LNG device is then passed to a BCF device before being transmitted to other components of the emergency services network 406. The LNG and/or BCF devices 416 are illustrated as a single element in FIG. 4 for the sake of convenience.

As illustrated, the emergency services network 406 includes one or more emergency services routing proxy (ESRP) devices 422. As discussed above, the ESRP 422 is a NENA i3 functional element that routes communication within the emergency services network 406 after it has been received by the LNG or BCF devices 416 based on location and policy. In this role, the ESRP 422 may be a session initiation protocol (SIP) proxy server.

As illustrated, the emergency services network 406 may also include one or more emergency call routing function (ECRF) devices 424. As discussed above, the ECRF 424 may receive location to service translation (LoST) queries from ESRPs 422 that include routing locations identifying a geographic location or alternate location data associated with incidents, and may provide addresses such as uniform resource identifiers (URIs) to route the incidents to appropriate PSAPs 426 associated with the routing location. Some ECRFs 424 may be present within the emergency services network 406 as shown, while some ECRFs 424 may be queried outside of the emergency services network 406 (not illustrated).

As illustrated, the emergency services network 406 includes one or more PSAPs 426. As discussed above, a PSAP 426 is any system that is capable of receiving and processing incidents such as calls, texts, images, data streams, or other communications intended for emergency services.

In the embodiment illustrated in FIG. 4, the emergency services network 406 is enhanced by virtue of the inclusion of a specially configured back-to-back user agent (B2BUA) device 418. In general, a B2BUA device 418 is a SIP element that modifies headers and body parts of signaling information that passes through it, unlike a proxy server, which is not allowed to modify headers and body parts of signaling information. At a high level, the B2BUA device 418 determines routing locations usable for routing incoming incidents based on a geographic location or alternate location data associated with the incident, and modifies the headers and/or body parts of the signaling information associated with the incident to add URL references to geographic information directly into the signaling information to be usable by the ESRPs 422 for routing. In some embodiments, the functionality of the B2BUA device 418 is provided by multiple computing devices, each of which may include components such as processors, computer-readable media, and network interfaces.

The B2BUA device 418 may be configured to communicate with one or more alternate location services 436 and/or a location transform data store 420. The alternate location services 436 may be any services that are capable of providing precise location data for incidents initiated by mobile devices 402. The HELO and ELS services discussed above are two non-limiting examples of alternate location services 436. In some embodiments, the NG911 Clearinghouse service offered by RapidSOS, Inc., may be another non-limiting example of an alternate location service 436. In some embodiments, the location transform data store 420 is configured to store information that allows data present in information retrieved by the B2BUA device 418 to be mapped to geographic information without having to query the ALI service 205. The B2BUA device 418 may also include a routing location data store 435, which may store the geographic information in a record that can be accessed using a URL generated by the B2BUA device 418.

As understood by one of ordinary skill in the art, a "data store" as described herein may be any suitable device configured to store data for access by a computing device. One example of a data store is a key-value store. However, any other suitable storage technique and/or device capable of organizing and storing the data may be used, such as a relational database management system (RDBMS), an object database, and/or the like. Other examples of a data store may also include data stored in an organized manner on a computer-readable storage medium, as described further below.

One example of a data store which includes reliable storage, but also low overhead, is a file system or database management system that stores data in files (or records) on a computer readable medium such as flash memory, random access memory (RAM), hard disk drives, and/or the like. Such a data store may be likely to be used locally by the mobile device 402. One example of a data store is a highly reliable, high-speed RDBMS or key-value store executing on one or more computing devices and accessible over a high-speed packet switched network. Such data stores may be likely to be used by components of the originating service provider 404, the emergency services network 406, and/or the alternative location services 436. One of ordinary skill in the art will recognize that separate data stores described herein may be combined into a single data store, and/or a single data store described herein may be separated into multiple data stores, without departing from the scope of the present disclosure.

In the illustrated embodiment, the B2BUA device 418 includes a data parsing engine 428, a location information collection engine 430, a location reference transformation engine 432, and a subsequent route determination engine 434. In some embodiments, the data parsing engine 428 is configured to extract information from the signaling information received by the B2BUA device 418, and to use the information from the signaling information to retrieve further information for use in querying the location transform data store 420. In some embodiments, the location information collection engine 430 is configured to query one or more alternate location services 436 to collect geographic information and/or alternate location data associated with incidents. In some embodiments, the location reference transformation engine 432 is configured to generate a query key based on the further information for use in querying the location transform data store 420, and to use the query key to query the location transform data store 420 for geographic information.

In some embodiments, the subsequent route determination engine 434 is configured to determine a routing location based on the information collected by the location reference transformation engine 432 and the location information collection engine 430, to store the routing location in a record in the routing location data store 435, and to update the signaling information to include a URL that points to the record in the routing location data store 435. In some embodiments, the subsequent route determination engine 434 is also configured to determine an ESRP 422 to receive the incident, and to transmit the modified signaling information to an appropriate ESRP 422. In some embodiments, the functionality described as being present in separate components of the B2BUA device 418 may be provided by a single component or by a different component. In some embodiments, the functionality as being present in a single component of the B2BUA device 418 may be split between multiple components. Further details of the operation of the components of the B2BUA device 418 are provided below.

Figure 5A:
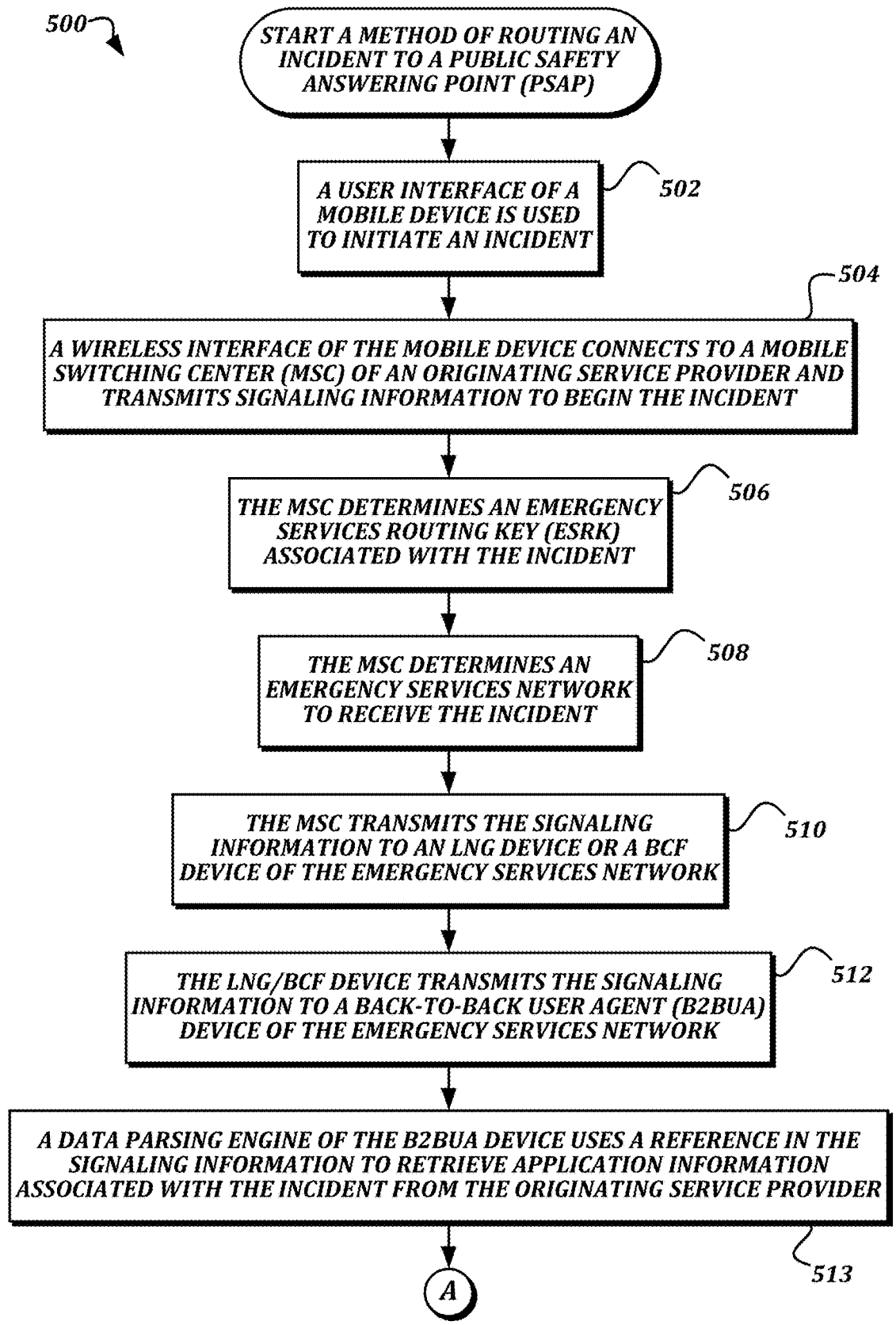
FIGS. 5A-5C are a flowchart that illustrates an example embodiment of a method of routing an incident to a PSAP according to various aspects of the present disclosure.
Figure 5B:
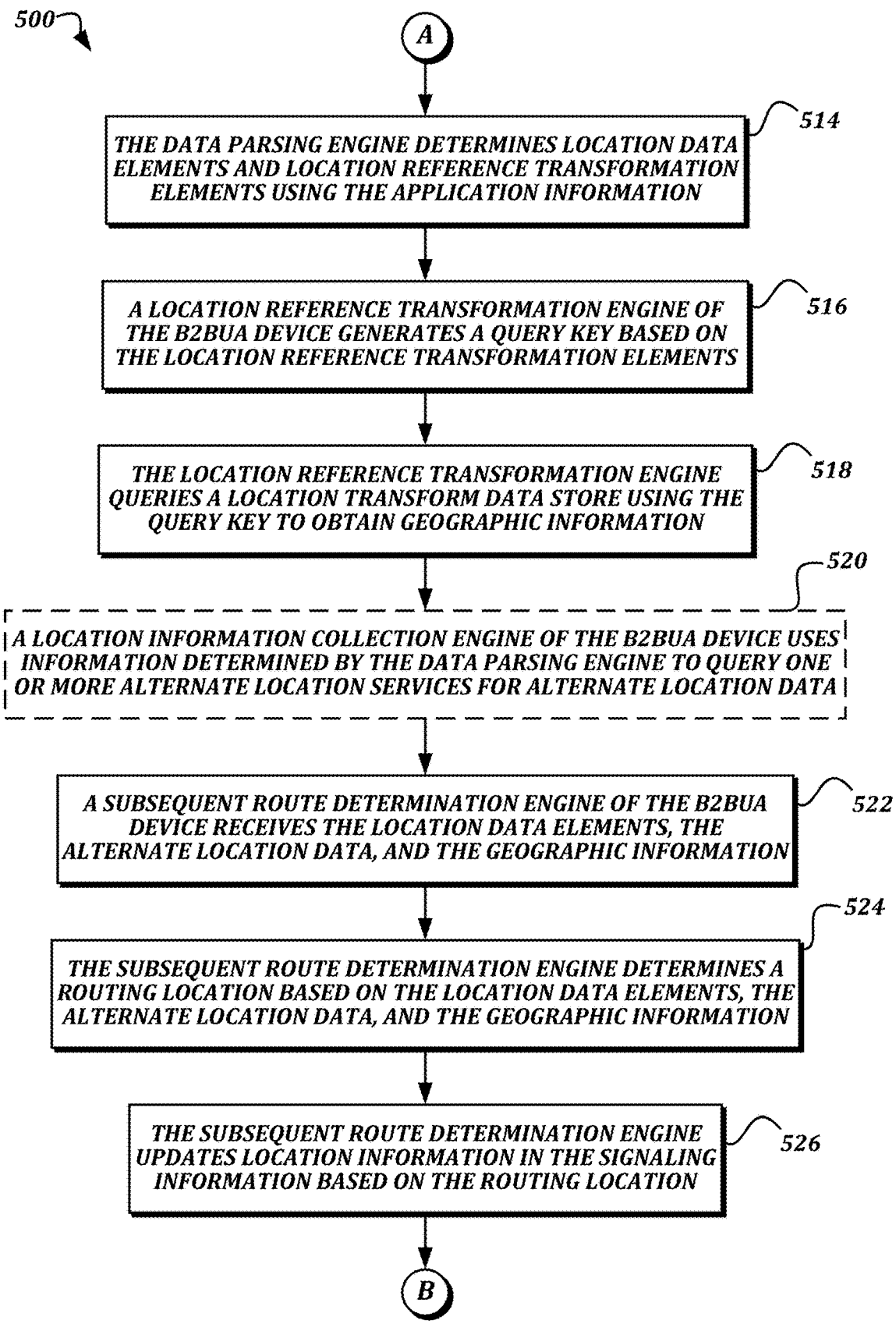
Figure 5C:
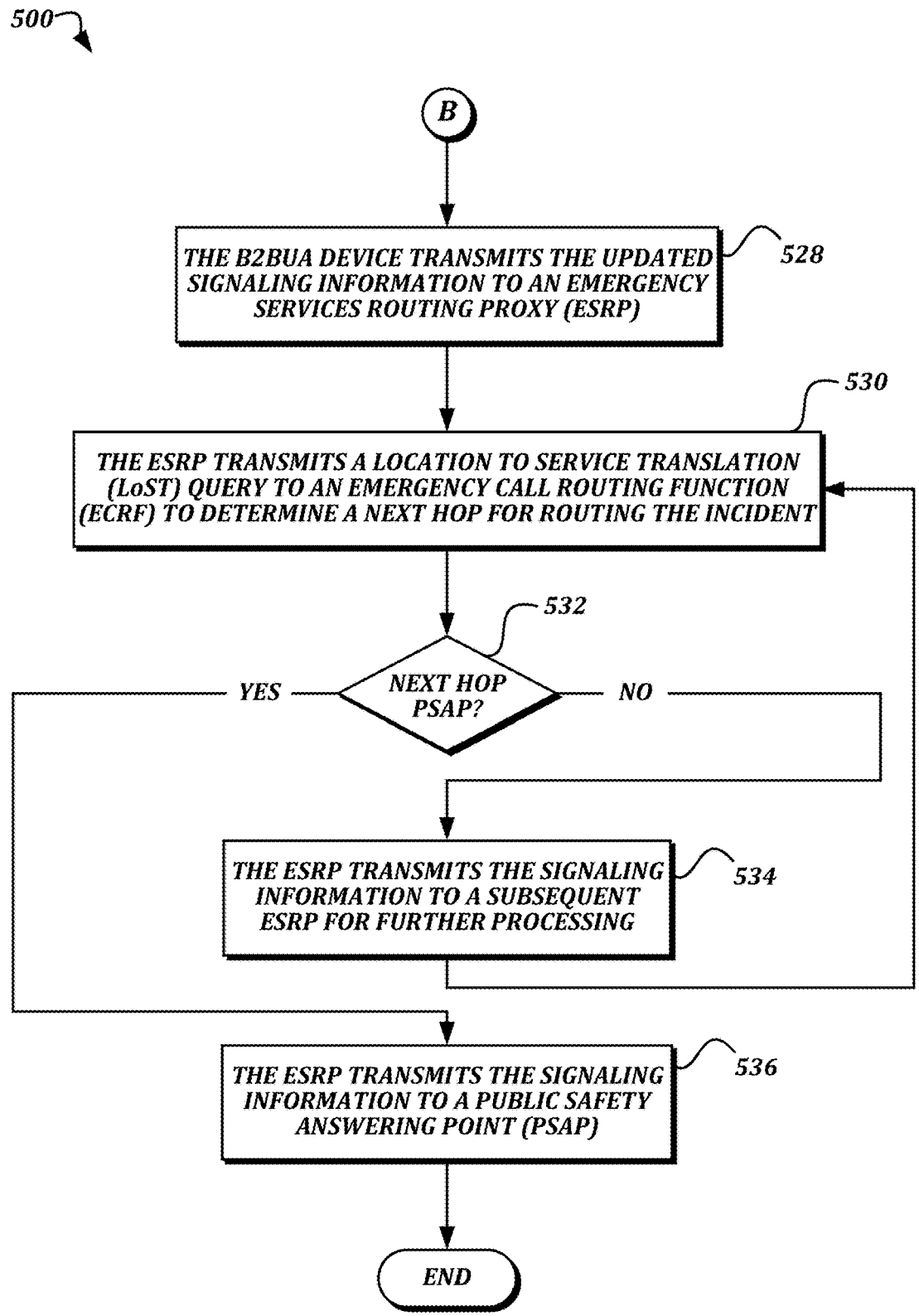

FIGS. 5A-5C are a flowchart that illustrates an example embodiment of a method of routing an incident to a public safety answering point (PSAP) according to various aspects of the present disclosure. The method 500 eliminates the query to the ALI database 205 performed in method 200, thereby reducing complexity in the network. Instead, a B2BUA device 418 uses data present in the signaling information of the incident to retrieve geographic information usable for routing from a simplified data store local to the emergency services network 406. The B2BUA device 418 may also query alternate location services 436 such as HELO or ELS for alternate location data usable for routing. The use of both data sources allows the B2BUA device 418 to support both sunny day scenarios (e.g., when high-quality location information is available from alternate location services 436) and rainy day scenarios (e.g., when high-quality location information is not available from such sources) and thereby provide location-based routing for all incoming incidents. One will note that the portions of method 500 from block 502 to block 510 are similar to the portions of method 300 from block 302 to block 310, as they occur before the routing-related improvements that are introduced in the emergency services network 406.

From a start block, the method 500 proceeds to block 502, where a user interface generated by a user interface engine 408 of a mobile device 402 is used to initiate an incident. For example, the user interface may be used to create a call, a text message, an image, or a communication within an over-the-top communication application. As discussed above, the user interface engine 408 may receive an input of a dialed emergency number, such as "911," or may initiate the incident in response to any other suitable input. At block 504, a wireless interface of the mobile device 402 connects to a mobile switching center (MSC) of an originating service provider 404 and transmits signaling information to begin the incident. Any suitable kind of signaling information that is supported by the originating service provider 404, such as SIP, SS7, XML-like tagged data, or any other kind of signaling information, may be used.

At block 506, the MSC 414 determines an emergency services routing key (ESRK) associated with the incident. The ESRK may be created by the network selection service 412, and may be determined by the MSC 414 by requesting it from the network selection service 412. The MSC 414 may query the network selection service 412 to receive the ESRK associated with the incident. The ESRK may be a pseudo-ANI or pANI value. A pseudo-ANI value for the incident may be determined by selecting a value from a value pool associated with a cell phone tower and/or sector from which the incident was received. The ESRK may later be used as a query key to retrieve information associated with the incident, such as the cell phone tower associated with the incident, the sector associated with the incident, a description of the area covered by the sector associated with the incident, and/or a latitude and longitude associated with the incident. For VoIP incidents, the network selection service 412 may create an Emergency Services Query Key (ESQK) instead of an ESRK, but the ESQK is used in the same ways as the ESRK is described herein.

At block 508, the MSC 414 determines an emergency services network 406 to receive the incident. The network selection service 412 may use the ESRK, characteristics of the cell phone tower and/or sector, or a default configuration for the MSC 414 or originating service provider 404 as a whole to determine the emergency services network 406 to receive the incident. The method 500 then proceeds to block 510, where the MSC 414 connects to a legacy network gateway (LNG) device or a border control function (BCF) device 416 of the emergency services network 406 and transmits signaling information to the LNG/BCF device 416. The signaling information may include the ESRK. The network address of the LNG/BCF device 416 may be determined along with the determination of the emergency services network 406 to receive the incident, and the selection of either an LNG device or a BCF device may be made based on the communication techniques supported by the MSC 414. At block 512, the LNG/BCF device 416 transmits the signaling information to a back-to-back user agent (B2BUA) device 418 of the emergency services network 406.

At block 513, a data parsing engine 428 of the B2BUA device 418 uses a reference in the signaling information to retrieve application information associated with the incident from the originating service provider 404. In some embodiments, the reference used by the data parsing engine 428 is a URL, the ESRK, or other information stored within the signaling information received by the B2BUA device 418. Importantly, the originating service provider 404 can provide the application information, which includes location data elements and/or location reference transformation elements, without querying an ALI database.

The method 500 then proceeds to a continuation terminal ("terminal A"). From terminal A (FIG. 5B), the method 500 proceeds to block 514, where the data parsing engine 428 determines location data elements and location reference transformation elements using the application information. In some embodiments, location data elements are data elements that themselves represent geographic information, such as latitude/longitude, what3word references, plus codes, and so on. In some embodiments, it is unlikely for the signaling information or the application information to include location data elements, but the data parsing engine 428 may check for them anyway. The lack of location data elements in the signaling information or the application information is one "rainy day" scenario in which other sources will be consulted to obtain location information for routing. In some embodiments, location reference transformation elements are data elements that can be used to query other data sources for location information.

In some embodiments, the application information may be provided in a structured format, such as a transaction capabilities application port (TCAP) message, and/or a SIP header that includes XML-formatted data. The TCAP message may also include data structured as XML, and may be parsed by the data parsing engine 428 using industry-standard techniques in order to retrieve specific data elements. Some examples of data elements that can be used as location reference transformation elements are listed in the NENA 57-002 Elements (Wireless Traffic Plan) Table, and include the following elements:

| | Type of information | Description |
|---|---|---|
| MSC Information | | |
| | Market ID | Carrier Market ID |
| | Switch ID | Carrier Switch ID |
| | Name Identifier | Carrier Switch Name Identifier |
| | MSC Default Route | Phase 0/Default 10 digit # if no routing info from switch. "Fast Busy" or "Announcement" can be input here |

-continued

| Type of information | | | Description |
|---|---|---|---|
| | | | based on PSAP request. |
| Carrier Cell Site Identification | | | |
| | Numeric Cell ID | | Carrier Cell Site ID (Market/Switch/Cell ID form unique key for cell site) |
| | Numeric Sector ID | | Carrier Sector ID usually indicates Omni or multi-sectored antenna faces |
| | Cell Site Common Name | | The Common Name is assigned by the wireless provider as a location name. |
| | Cell Site Unique ID (if appl.) | | Cell Site Identifier provided by the wireless service provider, it is usually unique to the cell site. |
| | Air Interface Technology | | Type of RF voice technology |
| Cell Site Location Information (MSAG Valid) | | | |
| | Street Address | | The address of the cell tower as provided by the wireless service provider. Needs to be MSAG valid. |
| | City | | Name of the city or area where the cell tower is physically located. |
| | State | | State where the cell tower is located |
| | County | | County where the cell site is located |
| Cell Tower | | | |
| | Latitude/Longitude in decimal degrees | | |
| | | Latitude (degrees) - (+/−2 before decimal/6 after decimal) | Physical location of the cell tower in decimal degrees (not the cell sector centroid) |
| | | Longitude (degrees) (+/−3 before decimal/6 after decimal) | Physical location of the cell tower in decimal degrees (not the cell sector centroid) |
| | Cell Sector Coverage | | |
| | | Sector Orientation/Azimuth (degrees, N = 0) | Orientation of the Cell Sector antenna face, with North being 0 degrees and South = 180 degrees |
| | | Beam Width (degrees) | Width of the sector antenna beam in degrees, under normal operating conditions |
| | | Sector Compass Orientation | Cell Sector Antenna orientation compass direction |
| | | Avg. Sector Radius Range (Miles) | Average true sector radius range (under average operating conditions). Radius at which cell tower's polygon of influence |

| Type of information | Description |
| --- | --- |
| ESRD or ESRK 1$^{st}$ No. | ends and another begins.<br>ESRD is a 10 digit # used for routing a wireless call & is assigned by cell sector. ESRK is a 10 digit # for routing & is assigned as a pool of numbers to a PSAP. The first # of range is entered here. |
| ESRK Last No. | The last number of the ESRK range should be entered here. |
| Update Type | New cell sites, re-homes, sector changes, etc. Use "new" or "add" for: 1) new cell sites, 2) the cell site information after it has been re-homed, 3) new sectors being added to cell site. Use "delete" for: 1) decommissioned cell sites, 2) the previous (old) cell site information of cell site being rehomed, 3) old sector information of cell site being re-sectorized. |
| Date of Latest Update | Date new cell site will go on air, date of re-home, date cell site will be decommissioned, etc. |
| Comment | Type of cell site changes: re-home, sector change, orientation change, etc. Also, old company name for re-homes after network mergers or buy-outs. The word "temporary" and date of decommission should be put in this section for COWs or COLTs. |

Per the industry standards, the signaling information or the application information may include information that can be used to retrieve an E2 response that has various TCAP elements. The TCAP elements may include a Location Description element, which may include the following information which can be parsed as XML and used as location reference transformation elements:

| Name | Tag | Max Chars | Type | Description |
| --- | --- | --- | --- | --- |
| Cell ID | <CEL></CEL> | 6 | ANV | Identification number indicating a geographic region of wireless coverage. i.e. the cell site where the call is received. Valid Values: 0-2047 |
| Company ID 1 | <CPF></CPF> | 5 | ANV | NENA registered Company Identification code for Service Provider providing wireline or |

-continued

| Name | Tag | Max Chars | Type | Description |
|---|---|---|---|---|
| | | | | wireless service to the customer. |
| County ID | <COI></COI> | 5 | ANV | County Identification Code |
| Customer Name | <NAM></NAM> | 32 | ANV | Subscriber Name |
| Emergency Medical Service Responder | <EMS></EMS> | 25 | ANV | Name of Emergency Medical Service Responder associated with the ESN of the caller. |
| Emergency Services Number | <ESN></ESN> | 5 | ANV | Emergency Service Number associated with the House Number and Street Name and Community Name. Note: The Service Provider, providing the E9-1-1 Selective Routing will assign ESN's. |
| Fire Department Service Responder | <FIR></FIR> | 25 | ANV | Name of Fire Department Service Responder associated with the ESN of the caller. |
| House Number | <HNO></HNO> | 10 | ANV | House Number |
| House Number Suffix | <HNS></HNS> | 4 | ANV | House Number Extension (e.g. ½) |
| Law Enforcement Service Responder | <LAW></LAW> | 25 | ANV | Name of Law Enforcement Service Responder associated with the ESN of the caller. |
| Location | <LOC></LOC> | 60 | ANV | Additional location information (free formatted) describing the exact location of the Calling Party Number. (e.g., "Apt 718" or "cell sector A") Emergency Response Location (ERL) - A Location to which a 9-1-1 emergency response team may be dispatched. The location should be specific enough to provide a reasonable opportunity for the emergency response team to quickly locate a caller anywhere within it. This information may be displayed at the PSAP |
| MSAG Community | <MCN></MCN> | 32 | AV | Valid service community name as identified by the MSAG |
| Post Directional | <POD></POD> | 2 | AV | Directional Trailing street direction suffix. Valid Entries: N S E W NE NW SE SW |
| Prefix Directional | <PRD></PRD> | 2 | AV | Directional Leading street direction prefix. Valid Entries: N S E W NE NW SE SW |
| Sector ID | <SEC></SEC> | 2 | AN | Sub set/section of a cell. Valid Values: 1-15 |
| State | <STA></STA> | 2 | A | Alpha U.S. state or Canadian province abbreviation, i.e. TX (Texas), ON (Ontario) |
| Street Name | <STN></STN> | 60 | ANV | Valid service address of the Calling Party Number |
| Street Name Suffix | <STS></STS> | 4 | AV | Valid street abbreviation, as defined by the U.S. Postal Service Publication 28. (e.g. AVE) |

At block 516, a location reference transformation engine 432 of the B2BUA device 418 generates a query key based on the location reference transformation elements. In some embodiments, the query key may be a complex key that combines two or more location reference transformation elements. For example, the query key may be a complex key that includes two or more of the Carrier ID value, the Cell ID value, and the Sector ID value extracted from the Location Description element of the TCAP elements in the E2 response. In some embodiments, the query key may be a simple key that is created by concatenating, hashing, or otherwise combining two or more of the location reference transformation elements.

At block 518, the location reference transformation engine 432 queries a location transform data store 420 using the query key to obtain geographic information. In some embodiments, the location transform data store 420 is a simple data store that correlates query keys directly to geographic information. For example, the location transform data store 420 may store a record that associates a given query key with a given latitude/longitude value. Any type of geographic information, such as a latitude/longitude value, a what3words value, a plus code (such as the code JQ8X+CH that identifies Boise, Id., and is used by Google Maps), a landmark identifier, or a plurality of such values that define a polygon may be stored by the location transform data store 420 and associated with a query key. The use of a simple data format by the location transform data store 420 improves speed by eliminating storage in more complicated data stores, such as GIS. Further, the location transform data store 420 can be co-located with the B2BUA device 418 or be within the B2BUA device 418, thus further reducing network latency.

At optional block 520, a location information collection engine 430 of the B2BUA device 418 uses information determined by the data parsing engine 428 to query one or more alternate location services 436 for alternate location data. Block 520 is illustrated as optional because in some embodiments, the geographic information retrieved from the location transform data store 420 may be the only information used by the B2BUA device 418 for location-based routing, or the alternate location services 436 may not be available. Any suitable information extracted by the data parsing engine 428 may be used to query the alternate location services 436. For example, the signaling information (or the information retrieved from the originating service provider 404 using the signaling information) may include a unique identifier associated with the mobile device 402, such as an international mobile equipment identity (IMEI) number, an international mobile subscriber identity (IMSI) number, an integrated circuit card ID (ICCID), a mobile equipment identifier (MEID), a mobile identification number (MIN), a mobile directory number (MDN), a mobile station international subscriber identity number (MSISDN), or other information which may be used to query the alternate location services 436 for information associated with the mobile device 402.

At block 522, a subsequent route determination engine 434 of the B2BUA device 418 receives the location data elements, the alternate location data, and the geographic information, and at block 524, the subsequent route determination engine 434 determines a routing location based on the location data elements, the alternate location data, and the geographic information. In some embodiments, the subsequent route determination engine 434 may determine the routing location by comparing the location data elements, the alternate location data, and the geographic information to determine which provides the information that should be used for routing. For example, if the alternate location data and the location data elements are either not present or were not retrieved at block 520, then the subsequent route determination engine 434 may simply use the geographic information retrieved from the location transform data store 420 as the routing location. As another example, if the alternate location data is present but indicates a high level of uncertainty (e.g., the reported location accuracy is lower than a predetermined threshold accuracy value, or indicates a greater uncertainty than the uncertainty of the geographic information retrieved from the location transform data store 420), then the subsequent route determination engine 434 may determine that the geographic information retrieved from the location transform data store 420 is of higher quality and therefore should be used as the routing location. As still another example, if the alternate location data is present and indicates a low level of uncertainty (e.g., the reported location accuracy is higher than a predetermined threshold accuracy value, or indicates a lower uncertainty than the uncertainty of the geographic information retrieved from the location transform data store 420), then the subsequent route determination engine 434 may determine that the alternate location data is of higher quality and therefore should be used as the routing location. As yet another example, the user may indicate an overall quality level for each alternate location service 436 and/or the location transform data store 420, and the subsequent route determination engine 434 may use the geographic information retrieved from the source that has the higher quality as indicated by the user.

At block 526, the subsequent route determination engine 434 updates location information in the signaling information based on the routing location. In some embodiments, the subsequent route determination engine 434 may update a header, a body part, or both a header and a body part of the signaling information based on the routing location. One non-limiting example of a header or body part of the signaling information that could be updated with the routing location is a Presence Information Data Format Location Object (PIDF-LO) document. Another non-limiting example of a header or body part of the signaling information that could be updated with the routing location is a GeoLocation Header of a SIP request, such as those illustrated in RFC 6442. In some embodiments that implement a "location-by-reference" technique, the subsequent route determination engine 434 creates a record in the routing location data store 435 that includes the routing location, and updates the signaling information to include a URL that points to the record in the routing location data store 435.

The method 500 then proceeds to a continuation terminal ("terminal B"). From terminal B (FIG. 5C), the method 500 proceeds to block 528, where the B2BUA device 418 transmits the updated signaling information to an emergency services routing proxy (ESRP) 422. The ESRP 422 is one of a set of network elements that route incidents to PSAPs 426 within the emergency services network 406. At block 530, the ESRP 422 transmits a location-to-service translation (LoST) query to an emergency call routing function (ECRF) 424 to determine a next hop for routing the incident. One will note that the LoST query transmitted by the ESRP 422 can include the routing location added to the signaling information by the B2BUA device 418 (or can include the routing location that is retrieved from the URL added to the signaling information), such that location-based routing can be performed by the ESRP 422 without transmitting a query to the ALI database. The ECRF 424 may provide a mapping from the geographic location indicated in the routing location to a particular PSAP 426, and may provide the identity of that particular PSAP 426 back to the ESRP 422.

The method 500 then proceeds to a decision block 532, where a determination is made regarding whether the next hop toward the PSAP is the PSAP itself, or another ESRP 422. In some embodiments, once the ESRP 422 has been instructed which PSAP 426 the incident should be routed to, the ESRP 422 can determine a network path to either connect directly to the PSAP 426 or to connect to the PSAP 426 via one or more additional ESRPs 422. If the next hop is another ESRP 422, then the result of decision block 532 is NO, and the method 500 proceeds to block 534, where the ESRP 422 transmits the signaling information to a subsequent ESRP 422 for further processing. The method 500 then returns to block 530 where the subsequent ESRP 422 processes the next hop.

Otherwise, if the next hop is the PSAP 426, then the result of decision block 532 is YES, and the method 500 proceeds to block 536. At block 536, the ESRP 422 transmits the signaling information to a PSAP 426. The PSAP 426 then processes the incident (e.g., terminates the call in order to allow an operator at the PSAP 426 and the caller to communicate, presents a text message to the operator, presents an image message to the operator, and so on). In some embodiments, the operator at the PSAP 426 may request updated geographic information while processing the incident. In such cases, the PSAP 426 may request the updated geographic information from the B2BUA device 418, which may have received an updated routing location and stored it in the routing location data store 435. The B2BUA device 418 may have received the updated routing location from the network selection service 412.

The method 500 then proceeds to an end block and terminates.

The above discussion describes embodiments wherein an incident is received by an LNG/BCF device 416 and is then transmitted to a B2BUA device 418 to be augmented using geographic information and/or alternate location data for routing. In some embodiments, the B2BUA device 418 may be placed at another point in the workflow. For example, in some embodiments, the B2BUA device 418 may be positioned after a first ESRP 422, such that the incoming incident is transmitted from the LNG/BCF device 416 to a first ESRP 422, and then from the first ESRP 422 to the B2BUA device 418 for supplementing the signaling information using geographic information and/or alternate location data to be used by either the first ESRP 422 or a subsequent ESRP 422. As another example, in some embodiments, the B2BUA device 418 may be positioned before the LNG/BCF device 416, or even within the originating service provider 404, such that the signaling information will be augmented using geographic information and/or alternate location data before it reaches the LNG/BCF device 416. As yet another example, instead of being embodied in a B2BUA device 418, the logic described above as being implemented by the B2BUA device 418 may be implemented in a web service, an application programming interface (API), or another programmatically accessible system that is directly callable by the LNG/BCF device 416.

Though embodiments of the present disclosure may be particularly useful in the field of using geographic locations to route emergency communications to PSAPs, the techniques disclosed herein are not limited to this scenario. Indeed, with the growing use of internet-of-things (IoT) devices, vehicle-to-infrastructure (V2I) communication, and other technologies in which devices communicate with geographically dispersed destination devices, using geographic information about the device initiating the communication in order to route the communication to an appropriate destination device is becoming more important. To that end, FIG. 6 is a block diagram that illustrates a non-limiting example embodiment of a system for routing any type of communication from a communication device to a destination device based on location information according to various aspects of the present disclosure.

In the illustrated embodiment, the system includes a communication device 602, an originating service provider 604, and a communication network 606. The communication device 602 may be any type of device capable of initiating communication with the originating service provider 604. The mobile device 402 illustrated above is a non-limiting example of a communication device 602. IoT devices and V2I devices are other non-limiting examples of communication devices 602. Typically, the communication device 602 communicates with the originating service provider 604 via 2G, 3G, 4G, 5G, LTE, WiFi, WiMAX, or other wireless technology; or by Ethernet, USB, FireWire, or other wired technology.

As above, the originating service provider 604 provides connectivity to the communication network for the communication device 604, and the communication network 606 receives communication traffic from multiple originating service providers 604, and connects the communication traffic to various destination devices 626.

Figure 6:
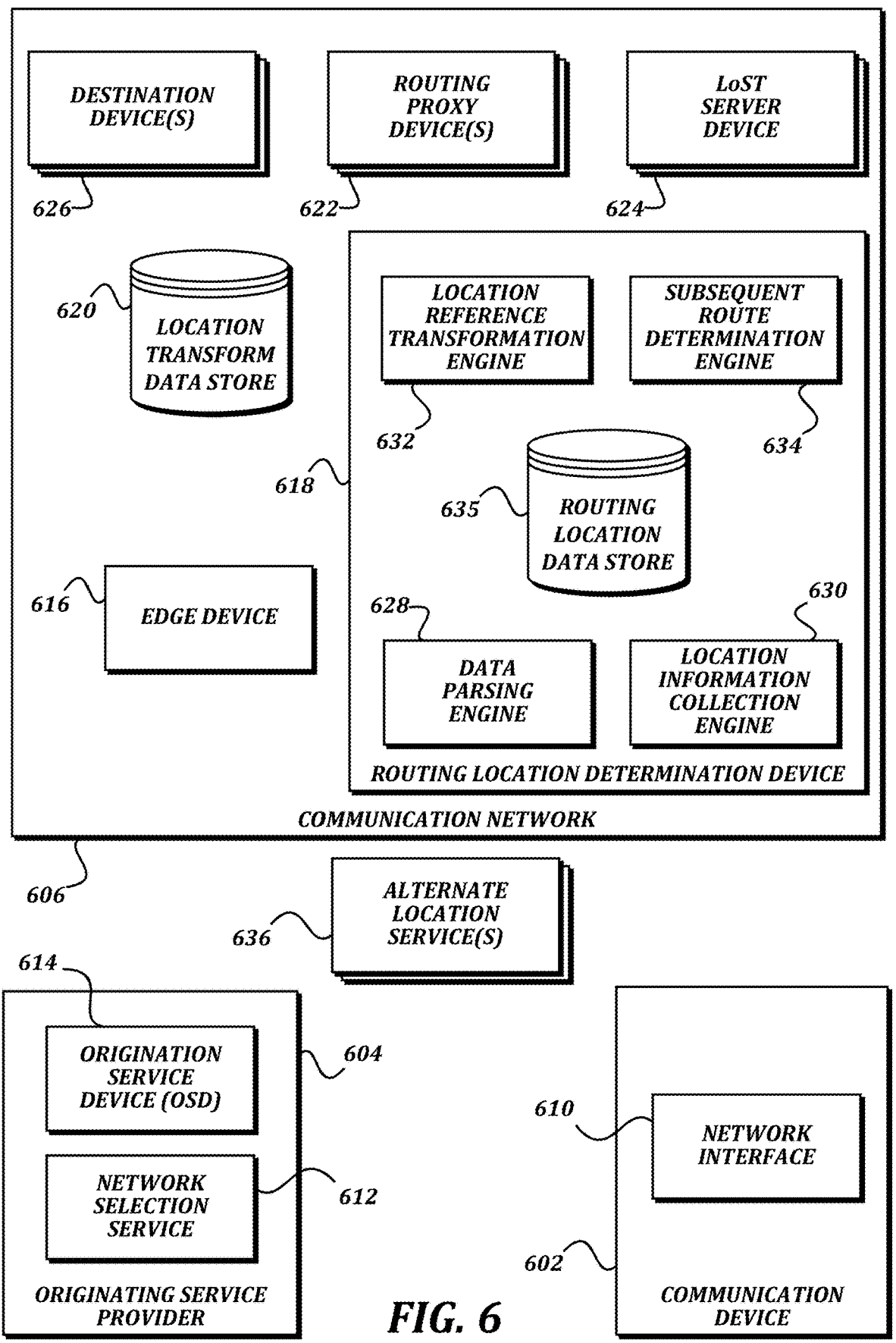
FIG. 6 is a block diagram that illustrates a non-limiting example embodiment of a system for routing any type of communication from a communication device to a destination device based on location information according to various aspects of the present disclosure.

As illustrated in FIG. 6, the communication device 602 includes a network interface 610. The network interface 610 is a combination of hardware and software components that allow the communication device 602 to communicate with the originating service provider 604. Any suitable technology may be used, including but not limited to 2G, 3G, 4G, 5G, and LTE for cellular and/or IP-based communications; Wi-Fi, WiMAX, and Bluetooth for IP-based wireless communications; and Ethernet, USB, and FireWire for wired communications. Some communication devices 602 may include additional components that are not illustrated or described herein, including but not limited to components for causing the communication to the originating service provider 604 to be initiated, such as a human-machine interaction (HMI) device.

As illustrated, the originating service provider 604 includes an origination service device (OSD) 614 and a network selection service 612. The OSD 614 is a collection of computing devices that primarily provide communication switching services including connection set-up, release, and routing. An MSC 414 as described above is one non-limiting example of an OSD 614. In some embodiments, an internet service provider (ISP) is a non-limiting example of an OSD 614 or an originating service provider 604. The network selection service 612 similar to the network selection service 412 illustrated and described above, in that it is a collection of computing devices that provide support services to the OSD 614, including providing services for determining a communication network 606 to which a communication should be transmitted.

The communication network 606 is any type of communication network. The emergency services network 406 illustrated above is one non-limiting example of a communication network 606. Other examples of a communication network 606 may include, but are not limited to, an ISP, a private network, and a public network.

The illustrated communication network 606 may include one or more edge devices 616, one or more routing proxy devices 622, one or more LoST server devices 624, and one or more destination devices 626. Some communication networks 606 may include additional components that are not illustrated or described herein.

The edge device 616 receives communications from originating service providers 604, and provides the communications to other components within the communication network 606. An LNG/BCF device 416 as discussed above is one non-limiting example of an edge device 616. A router, a load balancer, and a content-aware routing device are other non-limiting examples of an edge device 616. A given communication network 606 may include one or more edge devices 616.

As illustrated, the communication network 606 includes one or more routing proxy devices 622. The ESRP 422 illustrated and discussed above is one non-limiting example of a routing proxy device 622. A load balancer or another content-aware routing device are other non-limiting examples of routing proxy devices 622.

As illustrated, the emergency services network 606 may also include one or more LoST server devices 624. The ECRF 424 as discussed above is one non-limiting example of a LoST server device 624. Any other device or system that performs function of a Location to Service Translation (LoST) functional element as defined by the IETF may be other non-limiting examples of a LoST server device 624. The LoST server devices 624 may receive location to service translation (LoST) queries from routing proxy devices 622 that include routing locations identifying a geographic location or alternate location data associated with communications, and may provide addresses such as uniform resource identifiers (URIs) to route the communications to appropriate destination devices 626 associated with the routing location. Some LoST server devices 624 may be present within the communication network 606 as shown, while some LoST devices 624 may be queried outside of the communication network 606 (not illustrated).

As illustrated, the communication network 606 includes one or more destination devices 626. A PSAP 426 as discussed above is one non-limiting example of a destination device 626. In some embodiments, a destination device 626 is any system that is capable of receiving and processing communications such as calls, texts, images, data streams, or other communications generated by communication devices 602.

In the embodiment illustrated in FIG. 6, the communication network 606 includes a routing location determination device 618. The routing location determination device 618 adds routing locations to communications that pass through it. At a high level, the routing location determination device 618 determines routing locations usable for routing incoming communications based on a geographic location or alternate location data associated with the communications, and associates the routing location with the communications to be usable by the routing proxy devices 622 for routing. In some embodiments, the functionality of the routing location determination device 618 is provided by multiple computing devices, each of which may include components such as processors, computer-readable media, and network interfaces. The B2BUA device 418 as illustrated and discussed above is one non-limiting example of a routing location determination device 618. A web service that provides similar functionality is another non-limiting example of a routing location determination device 618.

The routing location determination device 618 may be configured to communicate with one or more alternate location services 636 and/or a location transform data store 620. The alternate location services 636 may be any services that are capable of providing precise location data for communications initiated by communication devices 602. The HELO, ELS, and RapidSOS services discussed above are two non-limiting examples of alternate location services 636. In some embodiments, the location transform data store 620 is configured to store information that allows data present in the communications received by the routing location determination device 618 to be mapped to geographic information without having to query an ALI database.

In the illustrated embodiment, the routing location determination device 618 includes a data parsing engine 628, a location information collection engine 630, a location reference transformation engine 632, a subsequent route determination engine 634, and a routing location data store 635. In some embodiments, the data parsing engine 628 is configured to extract information from the communications received by the routing location determination device 618, and to use this information to obtain further information for use in querying the location transform data store 620. In some embodiments, the location information collection engine 630 is configured to query one or more alternate location services 636 to collect geographic information and/or alternate location data associated with communications. In some embodiments, the location reference transformation engine 632 is configured to generate a query key based on the further information for use in querying the location transform data store 620, and to use the query key to query the location transform data store 620 for geographic information.

In some embodiments, the subsequent route determination engine 634 is configured to determine a routing location based on the information collected by the location reference transformation engine 632 and the location information collection engine 630, to store the routing location in a record in the routing location data store 635, and to update the signaling information to include a URL that points to the record in the routing location data store 635. In some embodiments, the subsequent route determination engine 634 is also configured to determine a routing proxy device 622 to receive the incident, and to transmit the communication and the associated routing location to an appropriate routing proxy device 622. In some embodiments, the functionality described as being present in separate components of the routing location determination device 618 may be provided by a single component or by a different component. In some embodiments, the functionality as being present in a single component of the routing location determination device 618 may be split between multiple components. Further details of the operation of the components of the routing location determination device 618 are provided below.

Figure 7A:
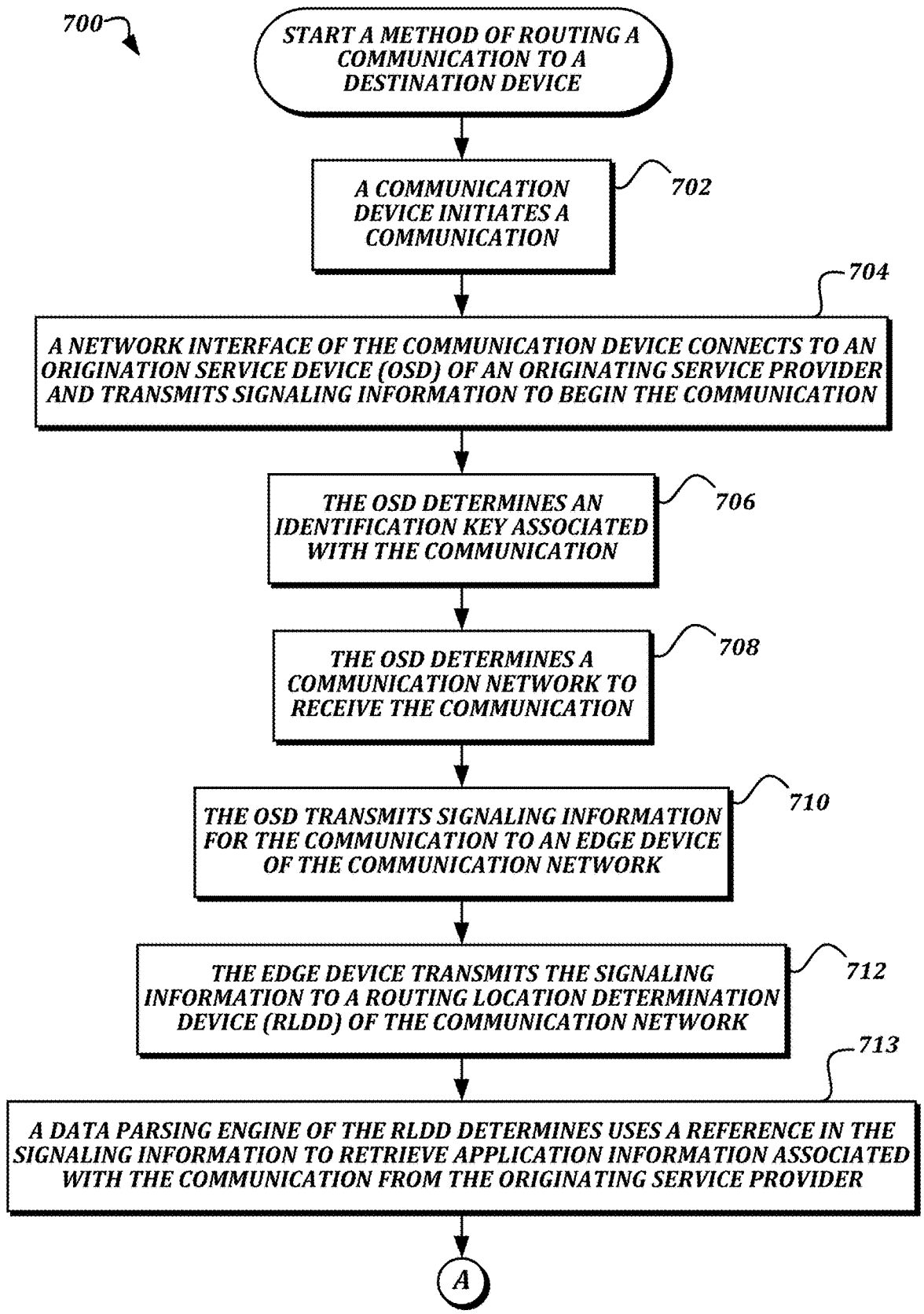
FIGS. 7A-7C are a flowchart that illustrates an example embodiment of a method of routing a communication to a destination device according to various aspects of the present disclosure.
Figure 7B:
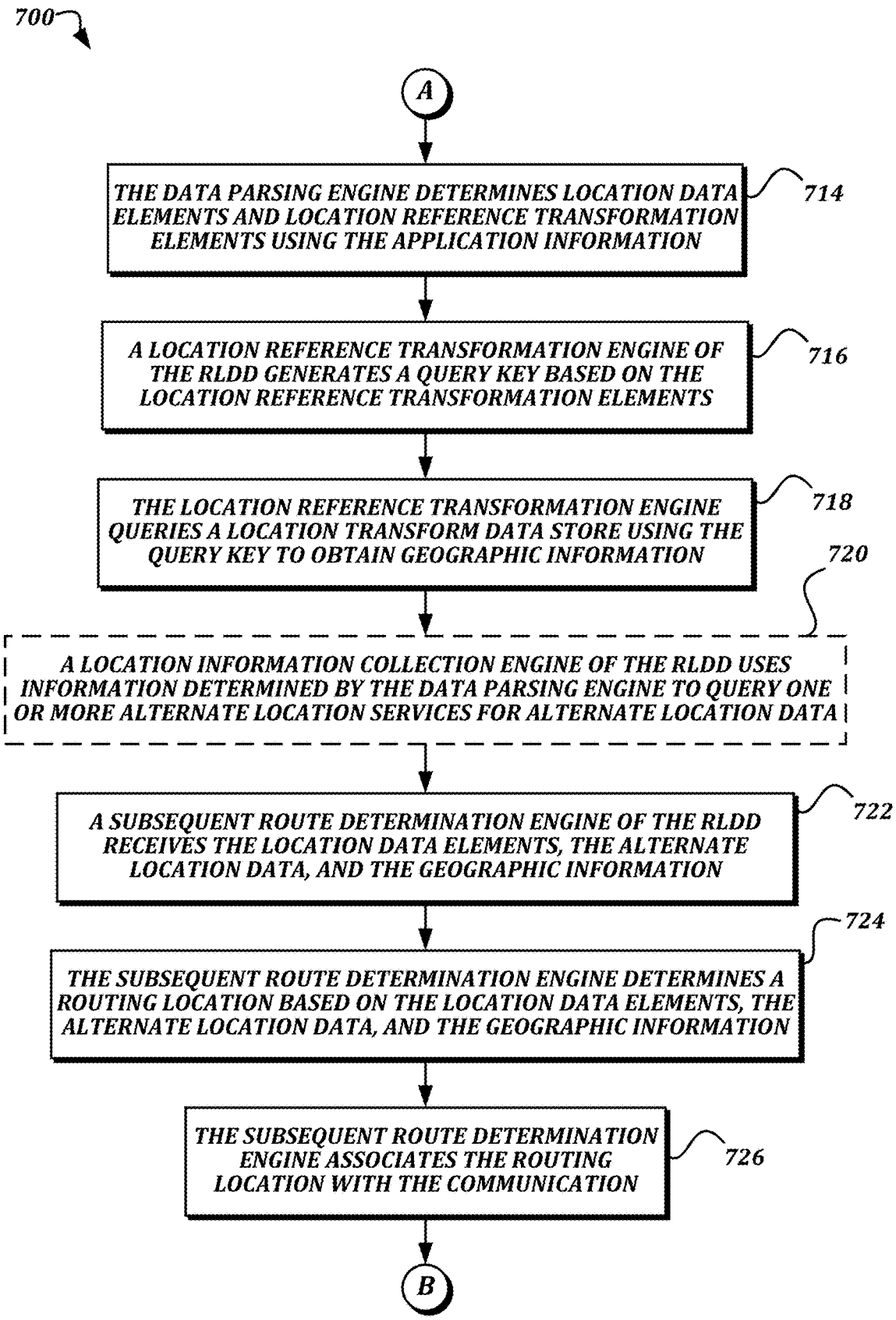
Figure 7C:
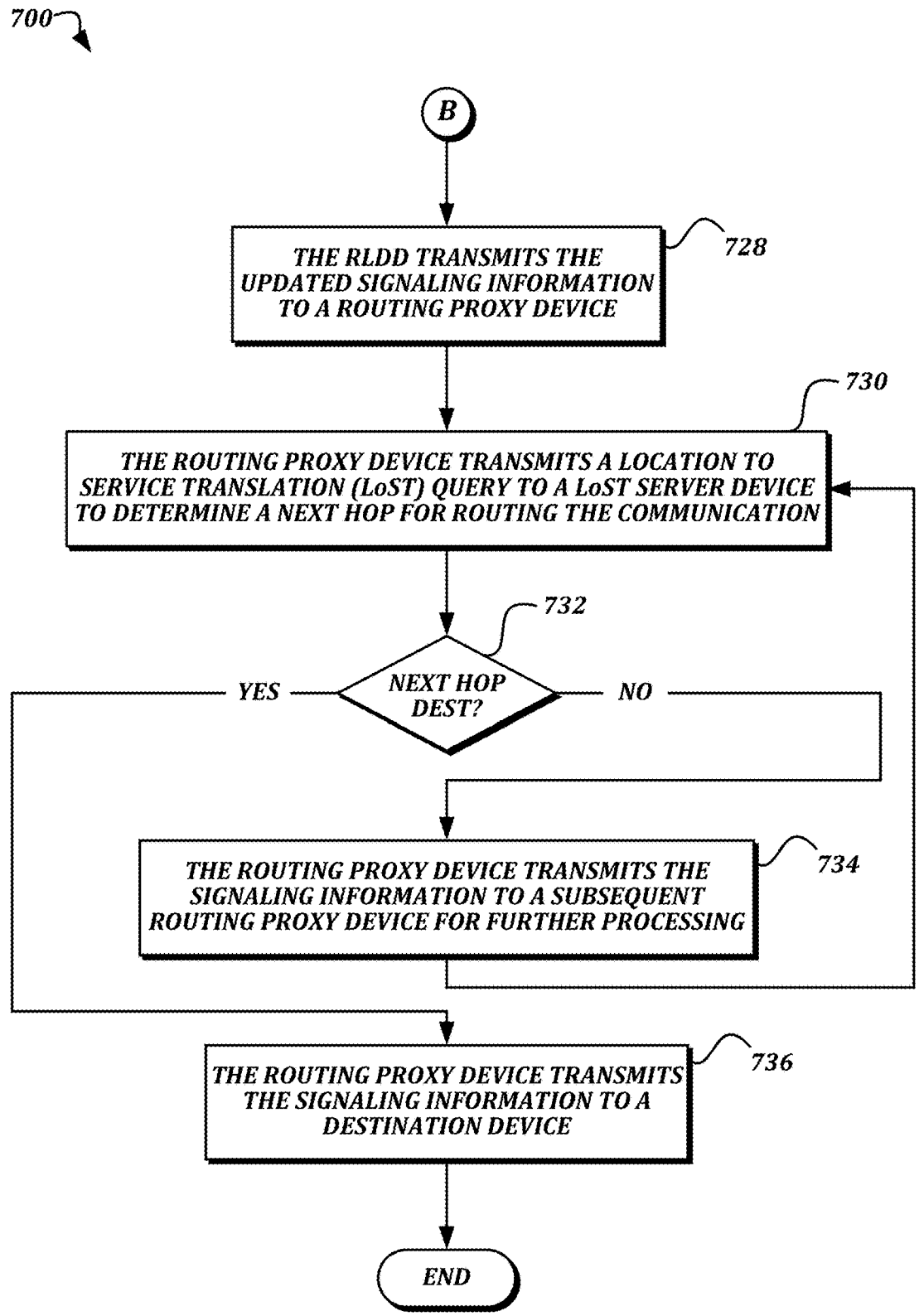

FIGS. 7A-7C are a flowchart that illustrates an example embodiment of a method of routing a communication to a destination device according to various aspects of the present disclosure. From a start block, the method 700 proceeds to block 702, where a communication device 602 initiates a communication. For example, a user interface may be used to create a call, a text message, an image, or a communication within a communication application. At block 704, a network interface 610 of the mobile device 602 connects to an origination service device (OSD) 614 of an originating service provider 604 and transmits signaling information to begin the communication. Any suitable kind of signaling information that is supported by the originating service provider 604, such as SIP, SS7, TCP/IP, XML-like tagged data, or any other kind of signaling information, may be used.

At block 706, the OSD 614 determines an identification key associated with the communication. The OSD 614 may query the network selection service 612 to receive the identification key associated with the communication. The identification key may be created by the network selection service 612. The ESRK and the ESQK described above are non-limiting examples of an identification key. The identification may later be used as a query key to retrieve information associated with the communication, such information may include information regarding network hardware used to receive the communication.

At block 708, the OSD 614 determines a communication network 606 to receive the communication. The network selection service 612 may use the identification key, characteristics of the network hardware used to receive the communication, or a default configuration for the OSD 614 or originating service provider 604 as a whole to determine the communication network 606 to receive the communication. The method 700 then proceeds to block 710, where the OSD 614 transmits signaling information for the communication to the edge device 616 of the communication network 606. The signaling information may include the identification key. The network address of the edge device 616 may be determined along with the determination of the communication network 606 to receive the communication. At block 712, the edge device 616 transmits the signaling information to a routing location determination device (RLDD) 618 of the communication network 606.

At block 713, a data parsing engine 628 of the routing location determination device 618 uses a reference in the signaling information to retrieve application information associated with the communication from the originating service provider 604. In some embodiments, the reference used by the data parsing engine 628 is a URL, the ESRK, or other information stored within the signaling information received by the routing location determination device 418. Importantly, the originating service provider 604 can provide the application information, which includes location data elements and/or location reference transformation elements, without querying an ALI database.

The method 700 then proceeds to a continuation terminal ("terminal A"). From terminal A (FIG. 7B), the method 700 proceeds to block 714, where the data parsing engine 628 determines location data elements and location reference transformation elements using the application information. In some embodiments, location data elements are data elements that themselves represent geographic information, such as latitude/longitude, what3word references, plus codes, and so on. In some embodiments, it is unlikely for the signaling information or the application information to include location data elements, but the data parsing engine 628 may check for them anyway. In some embodiments, location reference transformation elements are data elements that can be used to query other data sources for location information.

In some embodiments, the application information may be provided in a structured format, such as a transaction capabilities application port (TCAP) message, and/or a SIP header that includes XML-formatted data. The TCAP message may also include data structured as XML, and may be parsed by the data parsing engine 628 using industry-standard techniques in order to retrieve specific data elements. Some non-limiting examples of data elements that can be used as location reference transformation elements are listed in the NENA 57-002 Elements (Wireless Traffic Plan) Table, and were described in detail above. Per the industry standards, the signaling information or the application information may include information that can be used to retrieve an E2 response that has various TCAP elements. The TCAP elements may include a Location Description element, which may include information which can be parsed as XML and used as location reference transformation elements as described in detail above.

At block 716, a location reference transformation engine 632 of the routing location determination device 618 generates a query key based on the location reference transformation elements. In some embodiments, the query key may be a complex key that combines two or more location reference transformation elements. For example, the query key may be a complex key that includes two or more of a Carrier ID value, the Cell ID value, the Sector ID value extracted from the Location Description element of the TCAP elements in the E2 response; an owner ID, a device identifier, and a network identifier. In some embodiments, the query key may be a simple key that is created by concatenating, hashing, or otherwise combining two or more of the location reference transformation elements.

At block 718, the location reference transformation engine 632 queries a location transform data store 620 using the query key to obtain geographic information. In some embodiments, the location transform data store 620 is a simple data store that correlates query keys directly to geographic information. For example, the location transform data store 620 may store a record that associates a given query key with a given latitude/longitude value. Any type of geographic information, such as a latitude/longitude value, a what3words value, a neighborhood identifier, a plus code (such as the code JQ8X+CH that identifies Boise, Id., and is used by Google Maps), a landmark identifier, or a plurality of such values that define a polygon may be stored by the location transform data store 620 and associated with a query key. The use of a simple data format by the location transform data store 620 improves speed by eliminating storage in more complicated data stores, such as GIS. Further, the location transform data store 620 can be co-located with the routing location determination device 618 or be within the routing location determination device 618, thus further reducing network latency.

At optional block 720, a location information collection engine 630 of the routing location determination device 618 uses information determined by the data parsing engine 628 to query one or more alternate location services 636 for alternate location data. Block 720 is illustrated as optional because in some embodiments, the geographic information retrieved from the location transform data store 620 may be the only information used by the routing location determination device 618 for location-based routing, or the alternate location services 636 may not be available. Any suitable information extracted by the data parsing engine 628 may be used to query the alternate location services 636. For example, the signaling information (or the information retrieved from the originating service provider 604 using the signaling information) may include a unique identifier associated with the communication device 602, such as an international mobile equipment identity (IMEI) number, an international mobile subscriber identity (IMSI) number, an integrated circuit card ID (ICCID), a mobile equipment identifier (MEID), a mobile identification number (MIN), a mobile directory number (MDN), a media access control (MAC) address, an IP address, or other information which may be used to query the alternate location services 636 for information associated with the communication device 602.

At block 722, a subsequent route determination engine 634 of the routing location determination device 618 receives the location data elements, the alternate location data, and the geographic information, and at block 724, the subsequent route determination engine 634 determines a routing location based on the location data elements, the alternate location data, and the geographic information. In some embodiments, the subsequent route determination engine 634 may determine the routing location by comparing the location data elements, the alternate location data, and the geographic information to determine which provides the best information to be used for routing. For example, if the alternate location data and the location data elements are either not present or were not retrieved at block 720, then the subsequent route determination engine 634 may simply use the geographic information retrieved from the location transform data store 620 as the routing location. As another example, if the alternate location data is present but indicates a high level of uncertainty (e.g., the reported location accuracy is lower than a predetermined threshold accuracy value, or indicates a greater uncertainty than the uncertainty of the geographic information retrieved from the location transform data store 620), then the subsequent route determination engine 634 may determine that the geographic information retrieved from the location transform data store 620 is of higher quality and should be used as the routing location. As still another example, if the alternate location data is present and indicates a low level of uncertainty (e.g., the reported location accuracy is higher than a predetermined threshold accuracy value, or indicates a lower uncertainty than the uncertainty of the geographic information retrieved from the location transform data store 620), then the subsequent route determination engine 634 may determine that the alternate location data is of higher quality and should be used as the routing location. As yet another example, the user may indicate an overall quality level for each alternate location service 636 and/or the location transform data store 620, and the subsequent route determination engine 634 may use the geographic information retrieved from the source that has the higher quality as indicated by the user.

At block 726, the subsequent route determination engine 634 associates the routing location with the communication. In some embodiments, the subsequent route determination engine 634 may associate the routing location with the communication by updating a header, a body part, or both a header and a body part of the signaling information based on the routing location. One non-limiting example of a header or body part of the signaling information that could be updated with the routing location is a Presence Information Data Format Location Object (PIDF-LO) document. Another non-limiting example of a header or body part of the signaling information that could be updated with the routing location is a GeoLocation Header of a SIP request, such as those illustrated in RFC 6442. In some embodiments, the subsequent route determination engine 634 may add the routing location to a different part of the communication, couple the communication to another data packet that includes the routing location, encapsulate the communication in a message that includes the routing location, or use another technique to associate the routing location with the communication. In some embodiments that implement a "location-by-reference" technique, the subsequent route determination engine 634 creates a record in the routing location data store 635 that includes the routing location, and updates the signaling information to include a URL that points to the record in the routing location data store 635.

The method 700 then proceeds to a continuation terminal ("terminal B"). From terminal B (FIG. 7C), the method 700 proceeds to block 728, where the routing location determination device 618 transmits the updated signaling information to a routing proxy device 622. The routing proxy device 622 is one of a set of network elements that route communications to destination devices 626 within the communication network 606. At block 730, the routing proxy device 622 transmits a location-to-service translation (LoST) query to LoST server device 624 to determine a next hop for routing the communication. One will note that the LoST query transmitted by the routing proxy device 622 can include the routing location associated with the communication by the routing location determination device 618 (or can include the routing location that is retrieved from the URL added to the signaling information), such that location-based routing can be performed by the routing proxy device 622 without transmitting a query to the originating service provider 604, an ALI database, or any other source of location information. The LoST server device 624 may provide a mapping from the geographic location indicated in the routing location to a particular destination device 626, and may provide the identity of that particular destination device 626 back to the routing proxy device 622.

The method 700 then proceeds to a decision block 732, where a determination is made regarding whether the next hop toward the destination device 626 is the destination device 626 itself, or another routing proxy device 622. In some embodiments, once the routing proxy device 622 has been instructed which destination device 626 the communication should be routed to, the routing proxy device 622 can determine a network path to either connect directly to the destination device 626 or to connect to the destination device 626 via one or more additional routing proxy devices 622. If the next hop is another routing proxy device 622, then the result of decision block 732 is NO, and the method 700 proceeds to block 734, where the routing proxy device 622 transmits the signaling information to a subsequent routing proxy device 622 for further processing. The method 700 then returns to block 730 where the subsequent routing proxy device 622 processes the next hop.

Otherwise, if the next hop is the destination device 626, then the result of decision block 732 is YES, and the method 700 proceeds to block 736. At block 736, the routing proxy device 622 transmits the signaling information to a destination device 626. The destination device 626 then processes the communication (e.g., terminates the call in order to allow a user at the destination device 626 and the communication device 602 to communicate, presents a text message to the user, presents an image message to the user, provides a programmatic input from the communication device 602 to the destination device 626, and so on). In some embodiments, the destination device 626 may request updated geographic location information while processing the communication. In such cases, the destination device 626 may request the updated location geographic information from the routing location determination device 618, which may have received an updated routing location and stored it in the routing location data store 635. The routing location determination device 618 may have received the updated routing location from the network selection service 612.

The method 700 then proceeds to an end block and terminates.

As with the system illustrated in FIG. 4, the system illustrated in FIG. 6 and the method 700 described in FIGS. 7A-7C are an illustrative example workflow only. In some embodiments, the routing location determination device 618 may be placed at another point in the workflow, such as within the originating service provider 604, within the communication network 606 but before the edge device 616, within the edge device 616, or after an initial routing proxy device 622. Also, the destination device 626 may update the routing location stored in the routing location data store 635 for further use.

Figure 8:
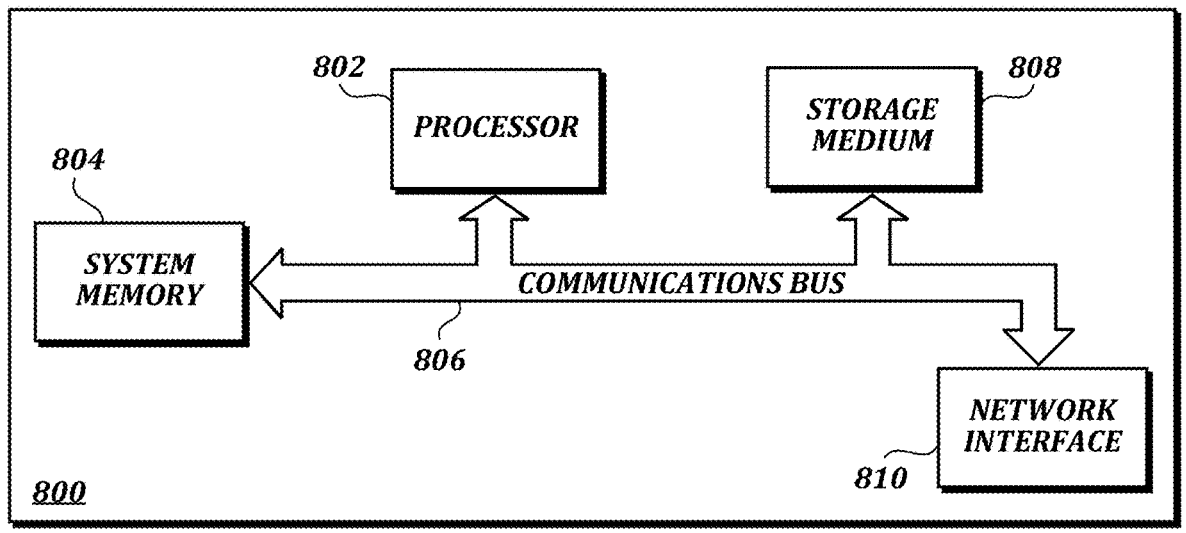
FIG. 8 is a block diagram that illustrates aspects of an exemplary computing device appropriate for use with embodiments of the present disclosure.

FIG. 8 is a block diagram that illustrates aspects of an exemplary computing device appropriate for use with embodiments of the present disclosure. While FIG. 8 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 800 may be any one of any number of currently available or yet to be developed devices.

In its most basic configuration, the computing device 800 includes at least one processor 802 and a system memory 804 connected by a communication bus 806. Depending on the exact configuration and type of device, the system memory 804 may be volatile or nonvolatile memory, such as read only memory ("ROM"), random access memory ("RAM"), EEPROM, flash memory, or similar memory technology. Those of ordinary skill in the art and others will recognize that system memory 804 typically stores data and/or program modules that are immediately accessible to and/or currently being operated on by the processor 802. In this regard, the processor 802 may serve as a computational center of the computing device 800 by supporting the execution of instructions.

As further illustrated in FIG. 8, the computing device 800 may include a network interface 810 comprising one or more components for communicating with other devices over a network. Embodiments of the present disclosure may access basic services that utilize the network interface 810 to perform communications using common network protocols. The network interface 810 may also include a wireless network interface configured to communicate via one or more wireless communication protocols, such as Wi-Fi, 2G, 3G, 4G, LTE, WiMAX, Bluetooth, and/or the like.

In the exemplary embodiment depicted in FIG. 8, the computing device 800 also includes a storage medium 808. However, services may be accessed using a computing device that does not include means for persisting data to a local storage medium. Therefore, the storage medium 808 depicted in FIG. 8 is represented with a dashed line to indicate that the storage medium 808 is optional. In any event, the storage medium 808 may be volatile or nonvolatile, removable or nonremovable, implemented using any technology capable of storing information such as, but not limited to, a hard drive, solid state drive, CD-ROM, DVD, or other disk storage, magnetic cassettes, magnetic tape, magnetic disk storage, and/or the like.

As used herein, the term "computer-readable medium" includes volatile and non-volatile and removable and non-removable media implemented in any method or technology capable of storing information, such as computer-readable instructions, data structures, program modules, or other data. In this regard, the system memory 804 and storage medium 808 depicted in FIG. 8 are merely examples of computer-readable media.

Suitable implementations of computing devices that include a processor 802, system memory 804, communication bus 806, storage medium 808, and network interface 810 are known and commercially available. For ease of illustration and because it is not important for an understanding of the claimed subject matter, FIG. 8 does not show some of the typical components of many computing devices. In this regard, the computing device 800 may include input devices, such as a keyboard, keypad, mouse, microphone, touch input device, touch screen, tablet, and/or the like. Such input devices may be coupled to the computing device 800 by wired or wireless connections including RF, infrared, serial, parallel, Bluetooth, USB, or other suitable connections protocols using wireless or physical connections. Similarly, the computing device 800 may also include output devices such as a display, speakers, printer, etc. Since these devices are well known in the art, they are not illustrated or described further herein. Unless specifically defined herein, all terms used herein have the same meaning as they would to one skilled in the art of the present disclosure.

While illustrative embodiments have been illustrated and described, it will be appreciated that various changes can be made therein without departing from the spirit and scope of the invention. For example, though the flowcharts illustrated herein proceed from a start block to an end block, in some embodiments, the functionality described in the various blocks illustrated in the flowchart may occur in different orders, may be performed multiple times, and may be performed in parallel.

The embodiments of the invention in which an exclusive property or privilege is claimed are defined as follows:

1. An emergency services network system, comprising:
   at least one legacy network gateway (LNG) device or border control function (BCF) device;
   at least one emergency services routing proxy (ESRP) device; and
   a routing location determination device;
   wherein the routing location determination device includes a non-transitory computer-readable medium having computer-executable instructions stored thereon that, in response to execution by one or more processors of the routing location determination device, cause the routing location determination device to perform actions comprising:
      receiving, from the at least one LNG device or BCF device, signaling information for an incident associated with a mobile telephony device;
      determining location reference transformation elements using the signaling information;
      querying a location transform data store to retrieve geographic information based on the location reference transformation elements;
      querying one or more alternate location services for alternate location data associated with the incident;
      comparing a quality of the geographic information to a quality of the alternate location data;
      storing the geographic information as a routing location in response to determining that the quality of the geographic information is higher than the quality of the alternate location data;
      storing the alternate location data as the routing location in response to determining that the quality of the geographic information is not higher than the quality of the alternate location data; and
      causing the incident to be routed by the at least one ESRP device to a public safety answering point (PSAP) based on the routing location by updating headers or body parts of the signaling information based on the routing location.

2. The system of claim 1, wherein determining location reference transformation elements using the signaling information includes retrieving session initiation protocol (SIP) data, transaction capabilities application port (TCAP) data, XML data, or JSON data using the signaling information.

3. The system of claim 1, wherein determining the location reference transformation elements includes determining a Carrier ID, a Cell ID, and a Sector ID.

4. The system of claim 3, wherein querying the location transform data store to retrieve geographic information includes:
   generating a complex key based on the Carrier ID, the Cell ID, and the Sector ID; and
   querying the location transform data store using the complex key.

5. The system of claim 1, wherein retrieving the geographic information includes retrieving at least one of a latitude and a longitude, a what3words value, a plus code, and a landmark; and
wherein the incident is not associated with a provisioned address.

6. The system of claim 1, wherein updating headers or body parts of the signaling information includes updating headers or body parts of the signaling information to include a uniform resource locator (URL) that points to a storage location of the routing location, and wherein the routing location is stored by the routing location determination device.

7. The system of claim 1, wherein comparing the quality of the geographic information to the quality of the alternate location data includes determining whether the alternate location data is available.

8. A method of enhancing location information for use in routing an incident associated with a mobile telephony device to a public safety answering point (PSAP), the method comprising:
receiving, by a routing location determination device of an emergency services network system, signaling information for the incident;
determining location reference transformation elements using the signaling information;
querying a location transform data store to retrieve geographic information based on the location reference transformation elements;
querying one or more alternate location services for alternate location data associated with the incident;
comparing a quality of the geographic information to a quality of the alternate location data;
storing the geographic information as a routing location in response to determining that the quality of the geographic information is higher than the quality of the alternate location data; and
storing the alternate location data as the routing location in response to determining that the quality of the geographic information is not higher than the quality of the alternate location data; and
causing the incident to be routed to a PSAP based on the routing location by updating headers or body parts of the signaling information based on the routing location.

9. The method of claim 8, wherein determining location reference transformation elements using the signaling information includes retrieving SIP data, TCAP data, XML data, or JSON data using the signaling information.

10. The method of claim 8, wherein determining the location reference transformation elements includes determining a Carrier ID, a Cell ID, and a Sector ID.

11. The method of claim 10, wherein querying the location transform data store to retrieve geographic information includes:
generating a complex key based on the Carrier ID, the Cell ID, and the Sector ID; and
querying the location transform data store using the complex key.

12. The method of claim 8, wherein retrieving the geographic information includes retrieving at least one of a latitude and a longitude, a what3words value, a plus code, and a landmark; and
wherein the incident is not associated with a provisioned address.

13. The method of claim 8, wherein updating headers or body parts of the signaling information based on the geographic information includes updating, by a SIP element device, headers or body parts of the signaling information to include a uniform resource locator (URL) that points to a storage location of the routing location.

14. The method of claim 13, wherein causing the incident to be routed to a PSAP based on the geographic information further includes transmitting, by the SIP element device, the signaling information that includes the URL that points to the storage location of the routing location to an emergency services routing proxy (ESRP) device for routing the incident to the PSAP associated with the routing location.

15. The method of claim 8, wherein comparing the quality of the geographic information to the quality of the alternate location data includes determining whether the alternate location data is available.

16. A non-transitory computer-readable medium having computer-executable instructions stored thereon that, in response to execution by one or more processors of a routing location determination device of an emergency services network system, cause the routing location determination device to perform actions for enhancing location information for use in routing an incident associated with a mobile telephony device to a public safety answering point (PSAP), the actions comprising:
receiving, by the routing location determination device, signaling information for the incident;
determining, by the routing location determination device, location reference transformation elements based on using the signaling information;
querying, by the routing location determination device, a location transform data store to retrieve geographic information based on the location reference transformation elements;
querying one or more alternate location services for alternate location data associated with the incident;
comparing a quality of the geographic information to a quality of the alternate location data;
storing the geographic information as a routing location in response to determining that the quality of the geographic information is higher than the quality of the alternate location data; and
storing the alternate location data as the routing location in response to determining that the quality of the geographic information is not higher than the quality of the alternate location data; and
causing, by the routing location determination device, the incident to be routed to a PSAP based on the routing location by updating headers or body parts of the signaling information based on the routing location.

* * * * *